US011816374B2

(12) United States Patent
Kobashi

(10) Patent No.: US 11,816,374 B2
(45) Date of Patent: Nov. 14, 2023

(54) INFORMATION PROCESSING APPARATUS, CONTROL METHOD, AND MEDIUM

(71) Applicant: CANON KABUSHIKI KAISHA, Tokyo (JP)

(72) Inventor: Kazufumi Kobashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/142,324

(22) Filed: Jan. 6, 2021

(65) Prior Publication Data

US 2021/0216261 A1 Jul. 15, 2021

(30) Foreign Application Priority Data

Jan. 14, 2020 (JP) ................................. 2020-003948

(51) Int. Cl.
*G06F 3/12* (2006.01)

(52) U.S. Cl.
CPC .......... *G06F 3/1259* (2013.01); *G06F 3/1234* (2013.01); *G06F 3/1253* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 5,422,954 | A * | 6/1995 | Berson | G07B 17/00508 380/51 |
| 2011/0179961 | A1 | 7/2011 | Yanagawa | |
| 2017/0264754 | A1* | 9/2017 | Mano | H04N 1/32694 |
| 2018/0059603 | A1* | 3/2018 | Miyahara | H04N 1/00076 |
| 2020/0233618 | A1* | 7/2020 | Ayukawa | G06F 3/1218 |
| 2020/0234421 | A1* | 7/2020 | Kaminaka | G06T 7/001 |

FOREIGN PATENT DOCUMENTS

| | | | |
|---|---|---|---|
| JP | 2005174367 | A * | 6/2005 |
| JP | 2011-152745 | A | 8/2011 |
| JP | 2012-111200 | A | 6/2012 |
| JP | 2012111200 | A * | 6/2012 |

OTHER PUBLICATIONS

Office Action dated Sep. 11, 2023, in Japanese Patent Application No. 2020-003948.

* cited by examiner

*Primary Examiner* — Fan Zhang
(74) *Attorney, Agent, or Firm* — VENABLE LLP

(57) ABSTRACT

A print system determines whether a setting of a print job meets a condition under which an inspection can be executed, sets information indicating the inspection instruction in a detail of the print job when it is determined that the setting of the print job meets the condition, and executes inspection processing on the basis of a scanned image and a reference image registered in advance according to the inspection instruction. In addition, notification information is output. The inspection processing is not executed when it has been determined that the setting of the print job does not meet the condition, and notification information is outputted indicating that the inspection processing has not been executed.

20 Claims, 25 Drawing Sheets

FIG. 6

| ORDER ID | CUSTOMER NAME | TRADE NAME | NUMBER OF COPIES | PAPER TYPE | PROCESSING | INSPECTION | DATA |
|---|---|---|---|---|---|---|---|
| 20190522001-001-001 | AAA PRESS | Book_A4_D_P | 10 | THICK PAPER, PLAIN PAPER | NONE | DO | xxxxxxc.pdf, xxxxxxb.pdf |
| 20190522002-002-001 | BBB PRESS | Pera_SRA4_D_P | 5 | EMBOSSED PAPER | NONE | DO | yyyyyy.pdf |
| 20190522003-002-002 | CCC STORE | SS_A4_D_P | 2 | PLAIN PAPER | NONE | DO NOT | zzzzzz.pdf |
| 20190522004-003-001 | CCC STORE | Book_SRA3_D_P | 10 | QUALITY PAPER, PLAIN PAPER | NONE | DO | xxxxxxa.pdf |
| 20190522005-003-002 | CCC STORE | Ticket_SRA4_D_P | 100 | MATTE COATED PAPER | SPECIAL COLOR | DO | yyyyyya.pdf |
| 20190522006-004-001 | DDD COMPANY | Book_A4_D_P | 10 | QUALITY PAPER, PLAIN PAPER | NONE | DO NOT | zzzzzzc.pdf, zzzzzzb.pdf |
| 20190522007-004-002 | DDD COMPANY | Banner_297x900_D_P | 8 | COATED PAPER | NONE | DO | xxxxxxb.pdf |

FIG. 7A

COMPONENT

*B AND W = BLACK-AND-WHITE

| JOB ID | ORDER ID | CUSTOMER NAME | TRADE NAME | | NUMBER OF COPIES | PAPER SIZE | PAPER TYPE | PROCE-SSING | INSPEC-TION | INSPEC-TION METHOD | PRINT METHOD | COLOR | OUTPUT DESTINA-TION | ... | DATA |
|---|---|---|---|---|---|---|---|---|---|---|---|---|---|---|---|
| 0001 | 20190522001-001-001 | AAA PRESS | Book_A4_D_P | Cover | 10 | SRA3 | THICK PAPER | NONE | — | — | SINGLE-SIDED | COLOR | iPRCxxxxx | ... | xxxxxxc.pdf |
| 0002 | 20190522001-001-001 | AAA PRESS | Book_A4_D_P | Body | 10 | SRA4 | PLAIN PAPER | NONE | — | — | DUPLEX | B AND W | VPxxxxx | ... | xxxxxxb.pdf |
| 0003 | 20190522002-002-001 | BBB PRESS | Pera_SRA4_D_P | Body | 5 | SRA4 | EMBOSSED PAPER | NONE | — | — | SINGLE-SIDED | COLOR | iPRCxxxxx | ... | yyyyyy.pdf |
| 0004 | 20190522003-002-002 | BBB PRESS | SS_A4_D_P | Body | 2 | A4 | PLAIN PAPER | NONE | — | — | SINGLE-SIDED | COLOR | iPRCxxxxx | ... | zzzzzz.pdf |
| 0005 | 20190522004-003-001 | CCC STORE | Book_SRA3_D_P | Cover | 10 | SRA3 | QUALITY PAPER | NONE | — | — | DUPLEX | COLOR | iPRCxxxxx | ... | xxxxxxa.pdf |
| 0006 | 20190522004-003-001 | CCC STORE | Book_SRA3_D_P | Body | 10 | SRA4 | PLAIN PAPER | NONE | — | — | SINGLE-SIDED | B AND W | VPxxxxx | ... | xxxxxxa.pdf |
| 0007 | 20190522005-003-002 | CCC STORE | Ticket_SRA4_D_P | Body | 100 | SRA4 | MATTE COATED PAPER | SPECIAL COLOR | — | — | SINGLE-SIDED | COLOR | iPRCxxxxx | ... | yyyyyya.pdf |
| 0008 | 20190522006-004-001 | DDD COMPANY | Book_A4_D_P | Cover | 10 | SRA3 | QUALITY PAPER | NONE | — | — | DUPLEX | COLOR | iPRCxxxxx | ... | zzzzzzc.pdf |
| 0009 | 20190522006-004-001 | DDD COMPANY | Book_A4_D_P | Body | 10 | SRA4 | PLAIN PAPER | NONE | — | — | SINGLE-SIDED | B AND W | VPxxxxx | ... | zzzzzzb.pdf |
| 0010 | 20190522007-004-002 | DDD COMPANY | Banner_297x900_D_P | Body | 8 | LONG SIZE | COATED PAPER | NONE | — | — | SINGLE-SIDED | COLOR | iPRCxxxxx | ... | xxxxxxb.pdf |

FIG. 7B

COMPONENT

INSPECTION METHOD

*B AND W = BLACK-AND-WHITE

| JOB ID | ORDER ID | CUSTOMER NAME | TRADE NAME | | NUMBER OF COPIES | PAPER SIZE | PAPER TYPE | PROCE -SSING | INSPEC -TION | | PRINT METHOD | COLOR | OUTPUT DESTINA -TION | ... | DATA |
|---|---|---|---|---|---|---|---|---|---|---|---|---|---|---|---|
| 0001 | 20190522001-001-001 | AAA PRESS | Book_A4_D_P | Cover | 10 | SRA3 | THICK PAPER | NONE | TO BE TARGETED | — | SINGLE-SIDED | COLOR | iPRCxxxxx | ... | xxxxxxc.pdf |
| 0002 | 20190522001-001-001 | AAA PRESS | Book_A4_D_P | Body | 10 | SRA4 | PLAIN PAPER | NONE | TO BE TARGETED | — | DUPLEX | B AND W | VPxxxxx | ... | xxxxxxb.pdf |
| 0003 | 20190522002-002-001 | BBB PRESS | Pera_SRA4_D_P | Body | 5 | SRA4 | EMBOSSED PAPER | NONE | TO BE TARGETED | — | SINGLE-SIDED | COLOR | iPRCxxxxx | ... | yyyyyy.pdf |
| 0004 | 20190522003-002-002 | BBB PRESS | SS_A4_D_P | Body | 2 | A4 | PLAIN PAPER | NONE | NOT TO BE TARGETED | — | SINGLE-SIDED | COLOR | iPRCxxxxx | ... | zzzzzz.pdf |
| 0005 | 20190522004-003-001 | CCC STORE | Book_SRA3_D_P | Cover | 10 | SRA3 | QUALITY PAPER | NONE | TO BE TARGETED | — | DUPLEX | COLOR | iPRCxxxxx | ... | xxxxxxa.pdf |
| 0006 | 20190522004-003-001 | CCC STORE | Book_SRA3_D_P | Body | 10 | SRA4 | PLAIN PAPER | NONE | TO BE TARGETED | — | SINGLE-SIDED | B AND W | VPxxxxx | ... | xxxxxxa.pdf |
| 0007 | 20190522005-003-002 | CCC STORE | Ticket_SRA4_D_P | Body | 100 | SRA4 | MATTE COATED PAPER | SPECIAL COLOR | TO BE TARGETED | — | SINGLE-SIDED | COLOR | iPRCxxxxx | ... | yyyyyya.pdf |
| 0008 | 20190522006-004-001 | DDD COMPANY | Book_A4_D_P | Cover | 10 | SRA3 | QUALITY PAPER | NONE | NOT TO BE TARGETED | — | DUPLEX | COLOR | iPRCxxxxx | ... | zzzzzzc.pdf |
| 0009 | 20190522006-004-001 | DDD COMPANY | Book_A4_D_P | Body | 10 | SRA4 | PLAIN PAPER | NONE | NOT TO BE TARGETED | — | SINGLE-SIDED | B AND W | VPxxxxx | ... | zzzzzzb.pdf |
| 0010 | 20190522007-004-002 | DDD COMPANY | Banner_297x900_D_P | Body | 8 | LONG SIZE | COATED PAPER | NONE | TO BE TARGETED | — | SINGLE-SIDED | COLOR | iPRCxxxxx | ... | xxxxxxb.pdf |

FIG. 7C

COMPONENT

*B AND W = BLACK-AND-WHITE

| JOB ID | ORDER ID | CUSTOMER NAME | TRADE NAME | | NUMBER OF COPIES | PAPER SIZE | PAPER TYPE | PROCE-SSING | INSPEC-TION | INSPEC-TION METHOD | PRINT METHOD | COLOR | OUTPUT DESTINA-TION | ... | DATA |
|---|---|---|---|---|---|---|---|---|---|---|---|---|---|---|---|
| 0001 | 20190522001-001-001 | AAA PRESS | Book_A4_D_P | Cover | 10 | SRA3 | PLAIN PAPER | NONE | TO BE TARGETED | IN-LINE | SINGLE-SIDED | COLOR | iPRCxxxxx | ... | xxxxxxc.pdf |
| 0002 | 20190522001-001-001 | AAA PRESS | Book_A4_D_P | Body | 10 | SRA4 | PLAIN PAPER | NONE | TO BE TARGETED | IN-LINE | DUPLEX | B AND W | VPxxxxx | ... | xxxxxxb.pdf |
| 0003 | 20190522002-002-001 | BBB PRESS | Pera_SRA4_D_P | Body | 5 | SRA4 | EMBOSSED PAPER | NONE | TO BE TARGETED | OFF-LINE | SINGLE-SIDED | COLOR | iPRCxxxxx | ... | yyyyyy.pdf |
| 0004 | 20190522003-002-002 | BBB PRESS | SS_A4_D_P | Body | 2 | A4 | PLAIN PAPER | NONE | NOT TO BE TARGETED | — | SINGLE-SIDED | COLOR | iPRCxxxxx | ... | zzzzzz.pdf |
| 0005 | 20190522004-003-001 | CCC STORE | Book_SRA3_D_P | Cover | 10 | SRA3 | QUALITY PAPER | NONE | TO BE TARGETED | IN-LINE | DUPLEX | COLOR | iPRCxxxxx | ... | xxxxxxa.pdf |
| 0006 | 20190522004-003-001 | CCC STORE | Book_SRA3_D_P | Body | 10 | SRA4 | PLAIN PAPER | NONE | TO BE TARGETED | IN-LINE | SINGLE-SIDED | B AND W | VPxxxxx | ... | xxxxxxa.pdf |
| 0007 | 20190522005-003-002 | CCC STORE | Ticket_SRA4_D_P | Body | 100 | SRA4 | MATTE COATED PAPER | SPECIAL COLOR | TO BE TARGETED | OFF-LINE | SINGLE-SIDED | COLOR | iPRCxxxxx | ... | yyyyyya.pdf |
| 0008 | 20190522006-004-001 | DDD COMPANY | Book_A4_D_P | Cover | 10 | SRA3 | PLAIN PAPER | NONE | NOT TO BE TARGETED | — | DUPLEX | COLOR | iPRCxxxxx | ... | zzzzzzc.pdf |
| 0009 | 20190522006-004-001 | DDD COMPANY | Book_A4_D_P | Body | 10 | SRA4 | PLAIN PAPER | NONE | NOT TO BE TARGETED | — | SINGLE-SIDED | B AND W | VPxxxxx | ... | zzzzzzb.pdf |
| 0010 | 20190522007-004-002 | DDD COMPANY | Banner_297x900_D_P | Body | 8 | LONG SIZE | COATED PAPER | NONE | TO BE TARGETED | OFF-LINE | SINGLE-SIDED | COLOR | iPRCxxxxx | ... | xxxxxxb.pdf |

FIG. 8A

| | | |
|---|---|---|
| PAPER TYPE | EMBOSSED | TABBED |
| GRAMMAGE | 200gsm OR MORE | |
| PAPER SIZE | 330.2mm×487.7mm OR MORE | |
| SPECIAL PROCESSING | SPECIAL COLOR | |

FIG. 8B

| | | |
|---|---|---|
| PAPER TYPE | EMBOSSED | TABBED |
| GRAMMAGE | 250gsm OR MORE | |
| PAPER SIZE | 330.2mm×487.7mm OR MORE | |
| SPECIAL PROCESSING | | |

FIG. 9

901 WF APPLICATION

MENU 902

PRINT 903 | LOG 904 | DELETE 905

JOB LIST 906

| JOB ID | ORDER ID | TRADE NAME | COMPONENT | STATUS | NUMBER OF COPIES | ... | INSPECTION METHOD | ... | OUTPUT DESTINATION |
|---|---|---|---|---|---|---|---|---|---|
| 0001 | 20190522001-001-001 | Book_A4_D_P | Cover | READY | 10 | ... | IN-LINE ▼ | ... | iPRCxxxxx ▼ |
| 0002 | 20190522001-001-001 | Book_A4_D_P | Body | READY | 10 | ... | IN-LINE ▼ | ... | VPxxxxx ▼ |
| 0003 | 20190522002-002-001 | Pera_SRA4_D_P | Body | READY | 5 | ... | ON-LINE ▼ | ... | iPRCxxxxx ▼ |
| 0004 | 20190522003-002-002 | SS_A4_D_P | Body | READY | 2 | ... | DO NOT ▼ | ... | iPRCxxxxx ▼ |
| 0005 | 20190522004-003-001 | Book_SRA3_D_P | Cover | READY | 10 | ... | IN-LINE ▼ | ... | iPRCxxxxx ▼ |
| 0006 | 20190522004-003-001 | Book_SRA3_D_P | Body | READY | 10 | ... | IN-LINE ▼ | ... | VPxxxxx ▼ |
| 0007 | 20190522005-003-002 | Ticket_SRA4_D_P | Body | READY | 100 | ... | OFF-LINE ▼ | ... | iPRCxxxxx ▼ |
| 0008 | 20190522006-004-001 | Book_A4_D_P | Cover | READY | 10 | ... | DO NOT ▼ | ... | iPRCxxxxx ▼ |
| 0009 | 20190522006-004-001 | Book_A4_D_P | Body | READY | 10 | ... | DO NOT ▼ | ... | VPxxxxx ▼ |
| 0010 | 20190522007-004-002 | Banner_297x900_D_P | Body | READY | 8 | ... | IN-LINE ▼ | ... | iPRCxxxxx ▼ |
| ... | ... | ... | ... | ... | ... | ... | ... | ... | ... |

907 908

909 DEVICE LIST

910

● iPRCxxxxx

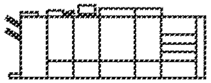

● iPRxxxxx

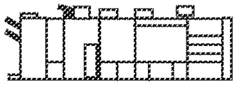

● VPxxxxx

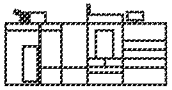

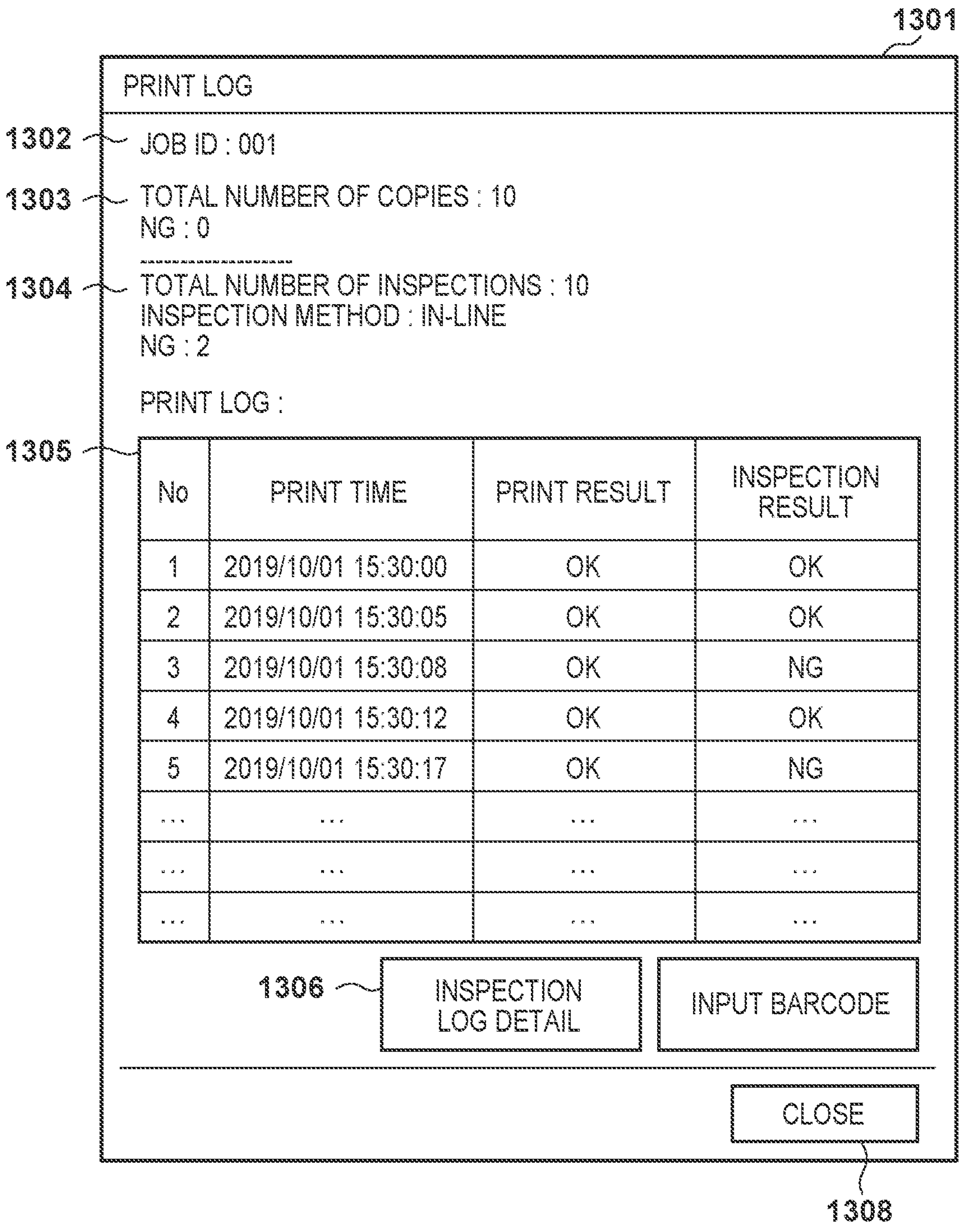
F I G. 13A
PRINT LOG  — 1301
1302 — JOB ID : 001
1303 — TOTAL NUMBER OF COPIES : 10
NG : 0
1304 — TOTAL NUMBER OF INSPECTIONS : 10
INSPECTION METHOD : IN-LINE
NG : 2
PRINT LOG :
1305 —
| No | PRINT TIME | PRINT RESULT | INSPECTION RESULT |
|----|------------|--------------|-------------------|
| 1 | 2019/10/01 15:30:00 | OK | OK |
| 2 | 2019/10/01 15:30:05 | OK | OK |
| 3 | 2019/10/01 15:30:08 | OK | NG |
| 4 | 2019/10/01 15:30:12 | OK | OK |
| 5 | 2019/10/01 15:30:17 | OK | NG |
| ... | ... | ... | ... |
| ... | ... | ... | ... |
| ... | ... | ... | ... |
1306 — [INSPECTION LOG DETAIL]   [INPUT BARCODE]
[CLOSE] — 1308

FIG. 16

COMPONENT

*B AND W = BLACK-AND-WHITE

| JOB ID | ORDER ID | CUSTOMER NAME | TRADE NAME | (COMPONENT) | NUMBER OF COPIES | PAPER SIZE | PAPER TYPE | PROCE-SSING | INSPEC-TION | INSPEC-TION METHOD | PRINT METHOD | COLOR | OUTPUT DESTINA-TION | ... | DATA |
|---|---|---|---|---|---|---|---|---|---|---|---|---|---|---|---|
| 0001 | 20190522001-001-001 | AAA PRESS | Book_A4_D_P | Cover | 10 | SRA3 | PLAIN PAPER | NONE | TO BE TARGETED | IN-LINE | SINGLE-SIDED | COLOR | iPRCxxxxx | ... | xxxxxxc.pdf |
| 0002 | 20190522001-001-001 | AAA PRESS | Book_A4_D_P | Body | 10 | SRA4 | PLAIN PAPER | NONE | TO BE TARGETED | IN-LINE | DUPLEX | B AND W | VPxxxxx | ... | xxxxxxb.pdf |
| 0003 | 20190522002-002-001 | BBB PRESS | WI_A4 | WI | 1 | A4 | PLAIN PAPER | NONE | NOT TO BE TARGETED | — | SINGLE-SIDED | B AND W | VPxxxxx | ... | WI_yyy.pdf |
| 0004 | 20190522002-002-001 | BBB PRESS | Pera_SRA4_D_P | Body | 5 | SRA4 | EMBOSSED PAPER | NONE | TO BE TARGETED | OFF-LINE | SINGLE-SIDED | COLOR | iPRCxxxxx | ... | yyyyyy.pdf |
| 0005 | 20190522003-002-002 | BBB PRESS | SS_A4_D_P | Body | 2 | A4 | PLAIN PAPER | NONE | NOT TO BE TARGETED | — | SINGLE-SIDED | COLOR | iPRCxxxxx | ... | zzzzzz.pdf |
| 0006 | 20190522004-003-001 | CCC STORE | Book_SRA3_D_P | Cover | 10 | SRA3 | QUALITY PAPER | NONE | TO BE TARGETED | IN-LINE | DUPLEX | COLOR | iPRCxxxxx | ... | xxxxxxa.pdf |
| 0007 | 20190522004-003-001 | CCC STORE | Book_SRA3_D_P | Body | 10 | SRA4 | PLAIN PAPER | NONE | TO BE TARGETED | IN-LINE | SINGLE-SIDED | B AND W | VPxxxxx | ... | xxxxxxa.pdf |
| 0008 | 20190522005-003-002 | CCC STORE | Ticket_SRA4_D_P | Body | 100 | SRA4 | MATTE COATED PAPER | SPECIAL COLOR | TO BE TARGETED | OFF-LINE | SINGLE-SIDED | COLOR | iPRCxxxxx | ... | yyyyyya.pdf |
| 0009 | 20190522006-004-001 | DDD COMPANY | Book_A4_D_P | Cover | 10 | SRA3 | PLAIN PAPER | NONE | NOT TO BE TARGETED | — | DUPLEX | COLOR | iPRCxxxxx | ... | zzzzzzc.pdf |
| 0010 | 20190522006-004-001 | DDD COMPANY | Book_A4_D_P | Body | 10 | SRA4 | PLAIN PAPER | NONE | NOT TO BE TARGETED | — | SINGLE-SIDED | B AND W | VPxxxxx | ... | xxxxxxb.pdf |
| 0011 | 20190522007-004-002 | DDD COMPANY | Banner_297x900_D_P | Body | 8 | LONG SIZE | COATED PAPER | NONE | TO BE TARGETED | OFF-LINE | SINGLE-SIDED | COLOR | iPRCxxxxx | ... | xxxxxxb.pdf |

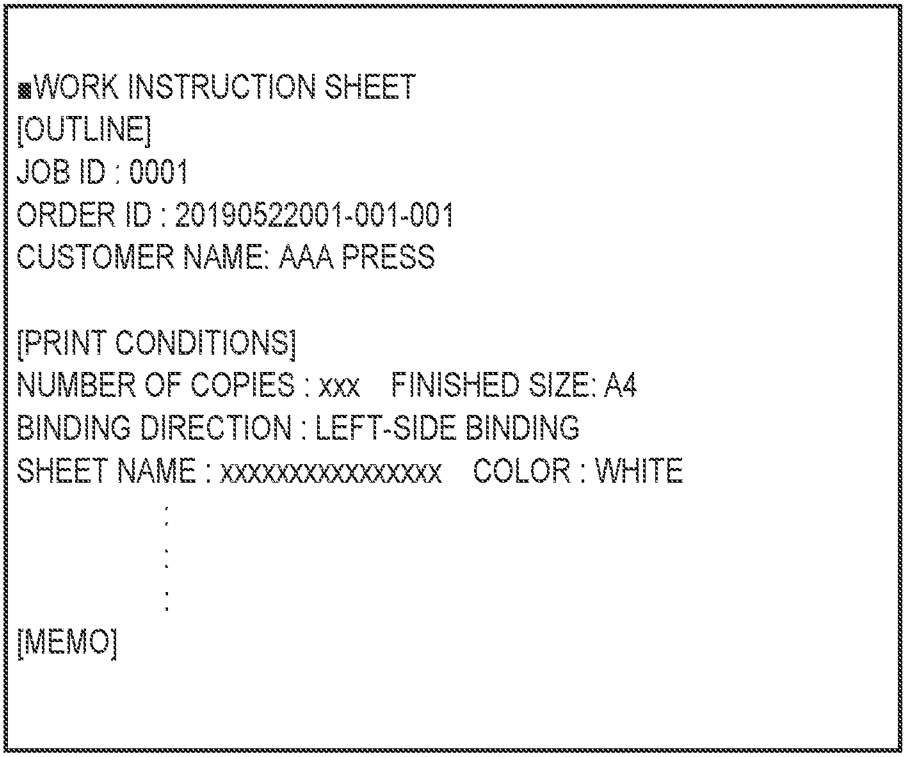

FIG. 17A

■WORK INSTRUCTION SHEET
[OUTLINE]
JOB ID : 0001
ORDER ID : 20190522001-001-001
CUSTOMER NAME: AAA PRESS

[PRINT CONDITIONS]
NUMBER OF COPIES : xxx    FINISHED SIZE: A4
BINDING DIRECTION : LEFT-SIDE BINDING
SHEET NAME : xxxxxxxxxxxxxxx    COLOR : WHITE

⋮

[MEMO]

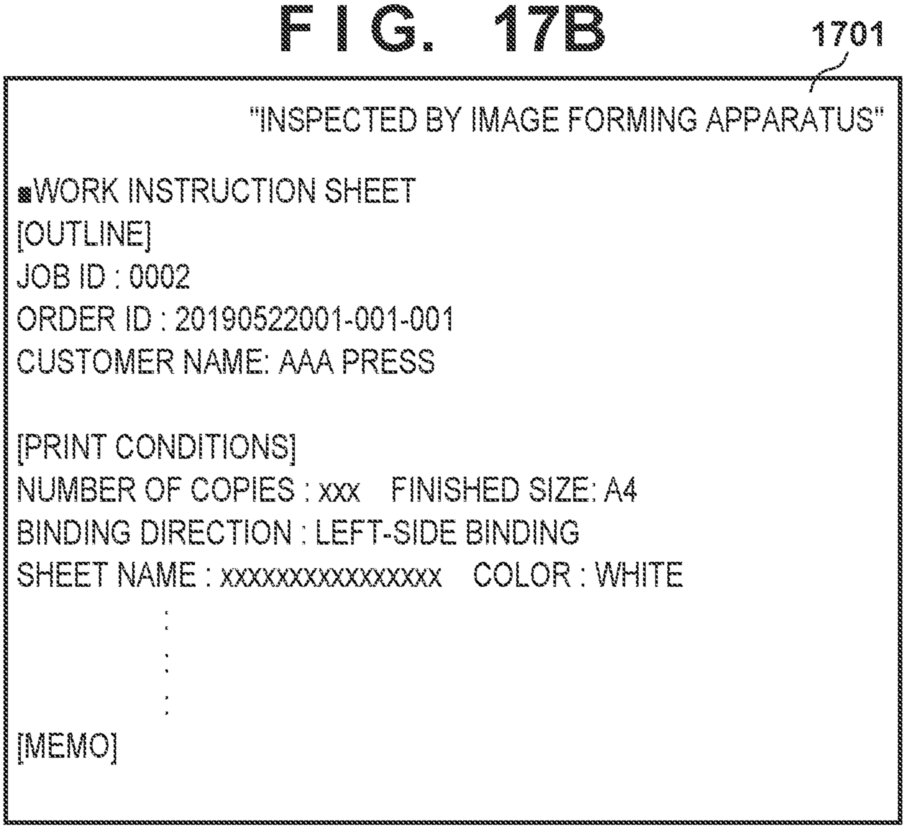

FIG. 17B

1701
"INSPECTED BY IMAGE FORMING APPARATUS"

■WORK INSTRUCTION SHEET
[OUTLINE]
JOB ID : 0002
ORDER ID : 20190522001-001-001
CUSTOMER NAME: AAA PRESS

[PRINT CONDITIONS]
NUMBER OF COPIES : xxx    FINISHED SIZE: A4
BINDING DIRECTION : LEFT-SIDE BINDING
SHEET NAME : xxxxxxxxxxxxxxx    COLOR : WHITE

⋮

[MEMO]

FIG. 17C                              1702

"MUST BE INSPECTED AFTER PRINTING"

■WORK INSTRUCTION SHEET
[OUTLINE]
JOB ID : 0004
ORDER ID : 20190522002-002-001
CUSTOMER NAME: BBB PRESS

[PRINT CONDITIONS]
NUMBER OF COPIES : xxx    FINISHED SIZE: A4
BINDING DIRECTION : LEFT-SIDE BINDING
SHEET NAME : xxxxxxxxxxxxxxx    COLOR : WHITE
              :
              :
              :

[MEMO]

F I G. 18C
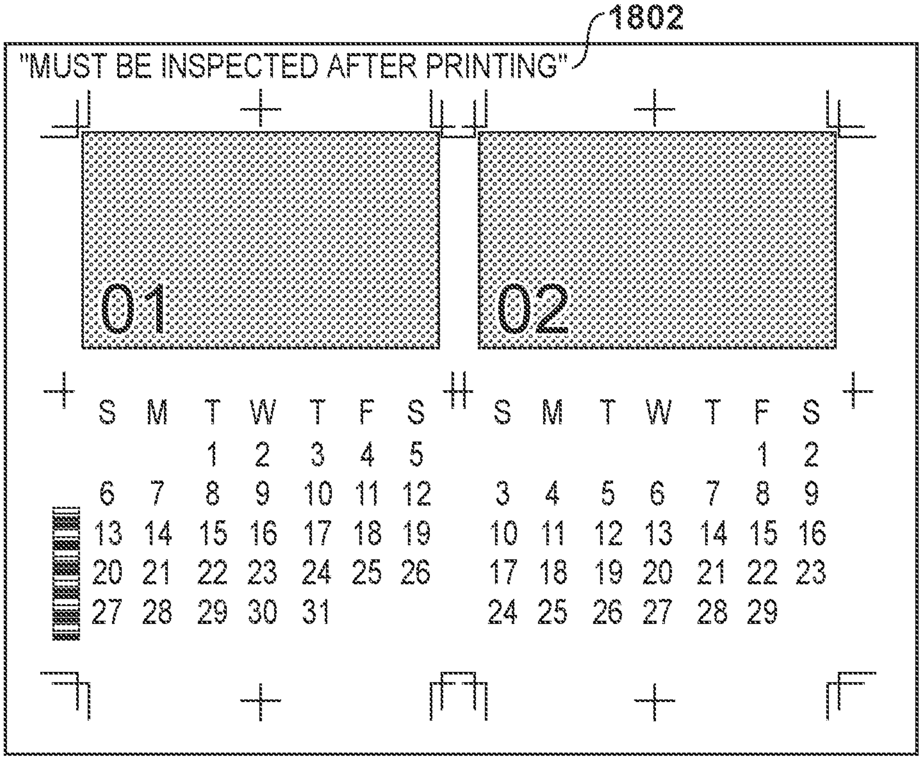

INFORMATION PROCESSING APPARATUS, CONTROL METHOD, AND MEDIUM

BACKGROUND OF THE INVENTION

Field of the Invention

The present invention relates to a printing system including an image forming apparatus and an inspection apparatus.

Description of the Related Art

Recently, printing systems are known in which a sheet printed by a printing apparatus can be inspected by an inspection apparatus while the sheet is being transported. In the inspection of the printed sheet, the inspection apparatus reads an image on the printed sheet which has been transported, evaluates the quality by analyzing the image which has been read, and on the basis of the evaluation result, determines whether or not the quality of the printed sheet meets a standard, i.e., is normal. The inspection apparatus can detect missing barcodes or ruled lines, image drops, printing defects, missing pages, color shifts, and the like as items for evaluation. When a printed sheet is determined to be a defective sheet having a quality that does not meet the standard, that defective sheet is discharged to a discharge destination different from normal sheets. This prevents defective sheets and normal sheets from becoming intermixed, and enables an operator to discard the defective sheets.

In the printing system disclosed in Japanese Patent Laid-Open No. 2012-111200, a printing apparatus holds a plurality of inspection apparatuses that process various types of inspections (e.g., image quality inspections and name collating inspections), and can execute inspections using the inspection apparatus appropriate for the type of print job. However, there are situations where due to the properties of the inspection apparatus in the printing apparatus, it is difficult to execute the appropriate inspection, depending on attributes of the print job. For example, with a print job that uses special paper attributes, such as embossed paper in which the paper's surface properties differ from sheet to sheet, the result of reading the image on the printed sheet will also differ from sheet to sheet. Thus, if inspections are performed on the basis of the images read by the inspection apparatus of the printing apparatus, it may not be possible to execute normal inspections, and a large amount of sheets determined to be defective may be needlessly discharged.

SUMMARY OF THE INVENTION

The present invention increases the reliability of inspections by ensuring that an inspection apparatus does not execute inspections on output items which are not suitable for inspection using the inspection apparatus.

The present invention has the following configuration. That is, according to one aspect of the present invention, provided is an information processing apparatus comprising: a determining unit that, when an inspection instruction is made for a print job and an image forming apparatus includes an image reader that reads an image formed on a sheet surface in response to the inspection instruction included in the print job, determines whether a setting of the print job meets a condition under which an inspection can be executed; a setting unit that sets information indicating the inspection instruction in a detail of the print job when the determining unit has determined that the setting of the print job meets the condition; a sending unit that sends the print job to the image forming apparatus; and an inspecting unit that executes inspection processing on the basis of an image sent from the image forming apparatus.

According to the present invention, the reliability of inspections can be increased by ensuring that an inspection apparatus does not execute inspections on output items which are not suitable for inspection using the inspection apparatus.

Further features of the present invention will become apparent from the following description of exemplary embodiments with reference to the attached drawings.

BRIEF DESCRIPTION OF THE DRAWINGS

FIGS. 5A-1 and 5A-2 show a flowchart illustrating inspection method setting processing according to a first embodiment of the present invention.

FIG. 6 is a diagram illustrating an example of an order information list.

FIG. 7A is a diagram illustrating an example of a print job information list.

FIG. 7B is a diagram illustrating an example of a print job information list.

FIG. 7C is a diagram illustrating an example of a print job information list.

FIGS. 8A and 8B are diagrams illustrating an example of an inspection condition table.

FIG. 9 is a diagram illustrating an example of a UI screen of a workflow application.

FIG. 13A is a diagram illustrating an example of a print log screen.

FIG. 16 is a diagram illustrating an example of a print job information list including an instruction job.

FIGS. 17A, 17B, and 17C are diagrams illustrating an example of print data of instructions.

FIGS. 18A, 18B, and 18C are diagrams illustrating an example of print data in a print job.

DESCRIPTION OF THE EMBODIMENTS

Figure 1:
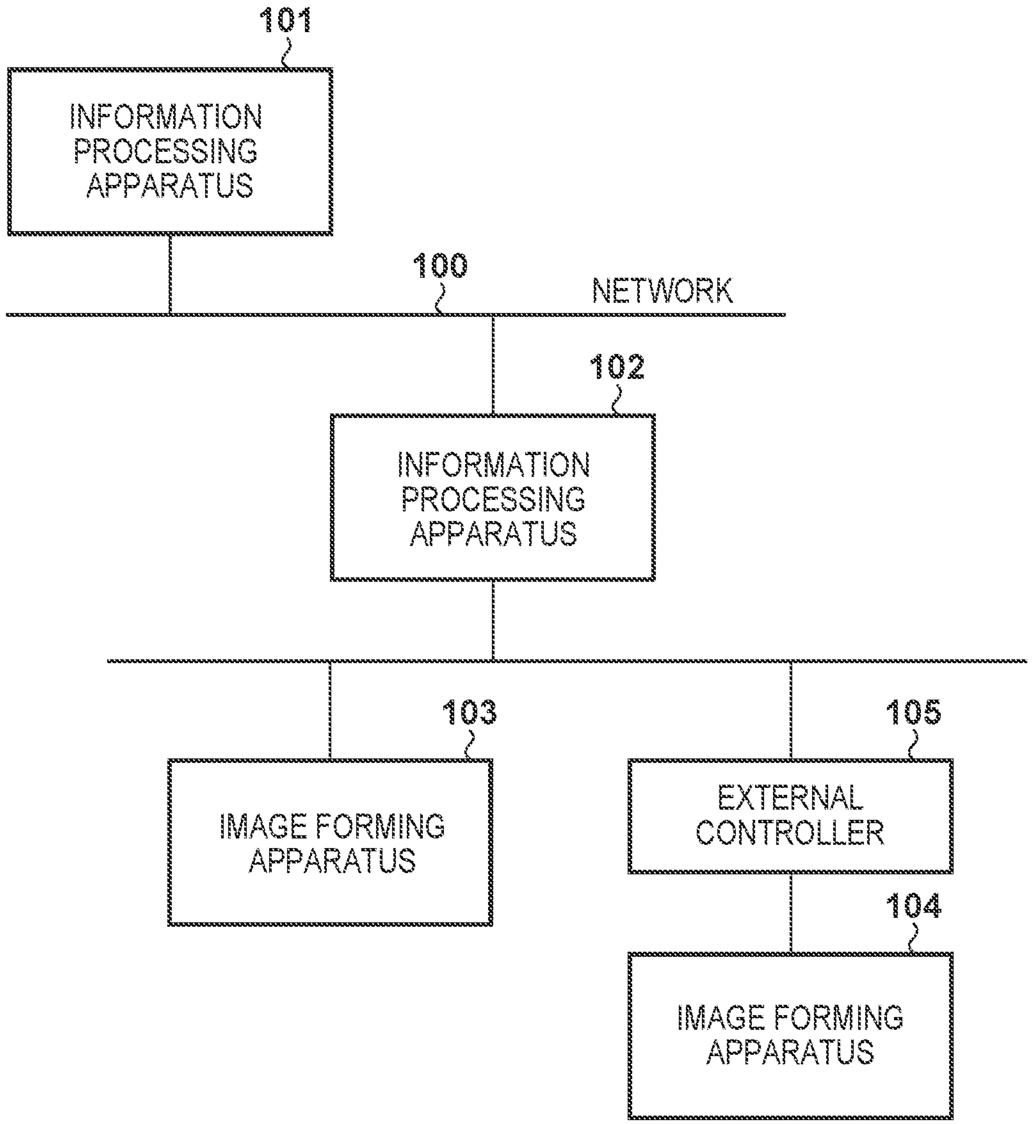
FIG. 1 is a diagram illustrating a system configuration according to the present invention.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating a system configuration according to an embodiment of the present invention. The system configuration according to the present embodiment includes information processing apparatuses 101 and 102, image forming apparatuses 103 and 104, and an external controller 105. The information processing apparatuses 101 and 102, the image forming apparatuses 103 and 104, and the external controller 105 are connected to each other over a network 100. The information processing apparatus 101 functions as an order management server that manages orders from customers. The information processing apparatus 102 is connected to the image forming apparatuses 103 and 104 and the external controller 105, and functions so as to generate a print job based on an order received from the order management server and send print data. The image forming apparatus 103 analyzes the print data sent from the information processing apparatus 102, converts the print data into dot images (rasterizing processing) one page at a time, and prints the pages. The printed material output from the image forming apparatus 103 is subjected to post-processing such as cutting, folding, and the like by a post-processing device (not shown), and the printed material is subject to processing such as inspection, packing, delivery, and the like by an operator. Upon receiving a printing instruction from the information processing apparatus 102, the external controller 105 performs print data analysis and rasterizing processing, and issues a printing instruction including the print data to the image forming apparatus 104. By having the print data analysis and rasterizing processing, which is normally performed in the image forming apparatuses, performed by the external controller 105 instead, a large amount of print data can be processed quickly. Although illustrated as being separate in FIG. 1, the information processing apparatuses 101 and 102 may be configured as a single information processing apparatus. The image forming apparatuses, too, may be configured as a single apparatus, or as two or more apparatuses.

Configuration of Information Processing Apparatuses

Figure 2:
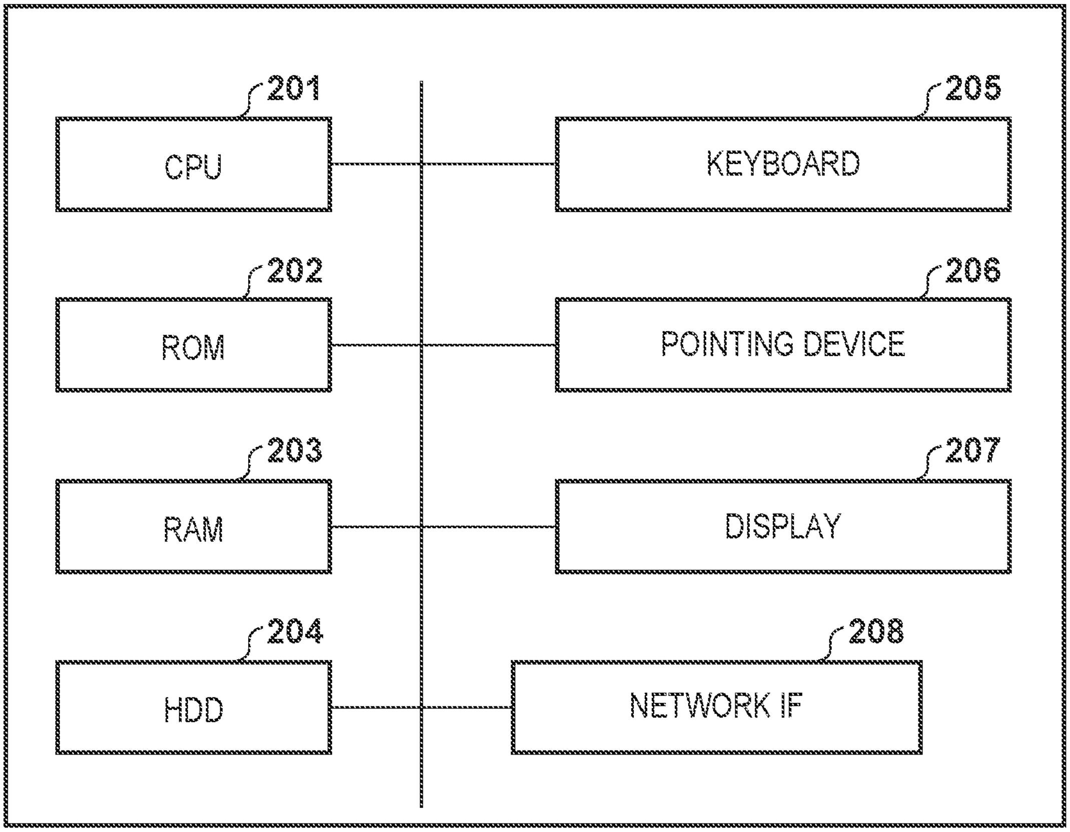
FIG. 2 is a diagram illustrating the hardware configuration of an information processing apparatus according to the present invention.

FIG. 2 is a diagram illustrating the hardware configuration of the information processing apparatuses 101 and 102 and the external controller 105. A CPU 201 reads out control programs stored in ROM 202 and executes various types of control processing. RAM 203 is used as the main memory of the CPU 201, a temporary storage region such as a work area, or the like. An HDD 204 stores image data, various types of programs, and the like. A keyboard 205 is an input device serving as an instruction input unit, and instructs the issuing of control commands, text input, and the like to an application according to the present invention (described later). A pointing device 206 is an input device that, along with the keyboard 205, serves as an instruction input unit, and instructs the issuing of control commands to the application (described later). A display 207 is an output device serving as a display unit, and displays commands input from the keyboard 205 and the pointing device 206, a state of the application according to the present invention (described later), and the like. A network I/F 208 connects the information processing apparatuses 101 and 102 and the external controller 105 to a network (a Local Area Network, the Internet, or the like). The information processing apparatuses 101 and 102 and the external controller 105 exchange various types of information with other devices on the network using the network I/F 208.

Configuration of Image Forming Apparatus

Figure 3:
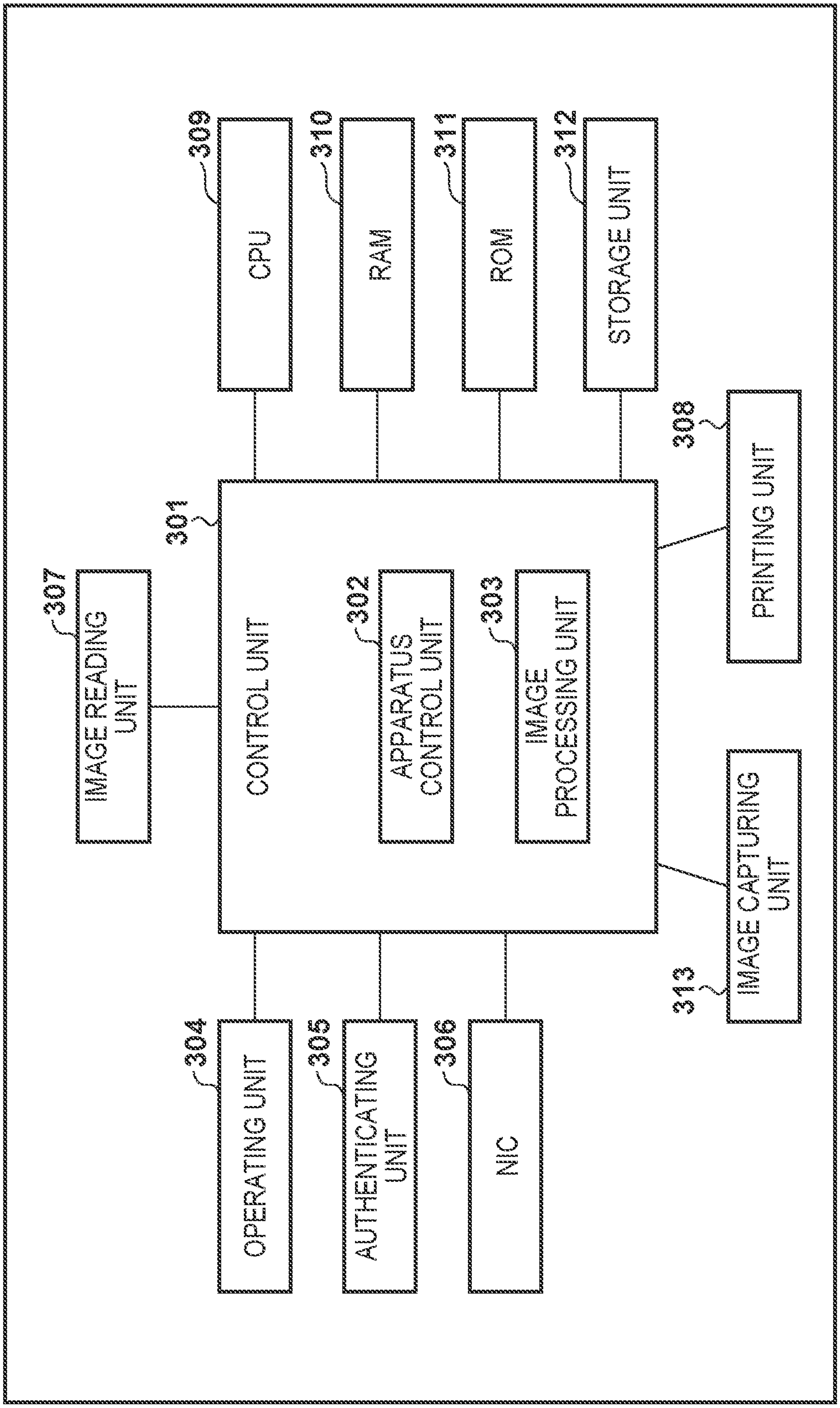
FIG. 3 is a diagram illustrating the hardware configuration of an image forming apparatus according to the present invention.

FIG. 3 is a diagram illustrating the hardware configuration of the image forming apparatuses 103 and 104. Each of the image forming apparatuses 103 and 104 includes an operating unit 304, an authenticating unit 305, a NIC 306, a CPU 309, RAM 310, ROM 311, a storage unit 312, an image reading unit 307, a printing unit 308, and an image capturing unit 313, and these elements are connected via a control unit 301.

The control unit 301 includes an apparatus control unit 302 that controls the image forming apparatus as a whole, and an image processing unit 303 that processes image data. The operating unit 304 is constituted by, for example, a software keyboard, a touch panel and other input/output devices, and is capable of inputting and displaying various types of setting values. The CPU 309 executes programs stored in the ROM 311, programs such as applications loaded into the RAM 310 from the storage unit 312, and the like. In other words, the CPU 309 functions as various processing units by executing programs stored in a readable storage medium. The RAM 310 is main memory of the CPU 309, and functions as a work area and the like. The image reading unit 307 is constituted by a scanner, for example, and is capable of obtaining a document image in image data format by reading a paper document or the like.

The control unit 301 provides the document image stored in the storage unit 312 to the operating unit 304, and executes processing for outputting the document image in the operating unit 304. Likewise, the control unit 301 provides a document image stored in the storage unit 312 to the printing unit 308, and the printing unit 308 executes processing for outputting the document image in various formats. For example, the printing unit 308 can execute processing for outputting image data corresponding to the document image to a storage medium. Alternatively, the printing unit 308 may have a printing function, and may execute processing for outputting the document image on an output medium such as a paper medium or the like. The image capturing unit 313 corresponds to an inspection apparatus in the image forming apparatus, is constituted by a scanner, for example, and executes processing for reading a document image of the output medium output by the printing unit 308. In other words, the image capturing unit 313 has a reading function for reading an image formed on a sheet. Each of the image forming apparatuses 103 and 104 is connected to the network via the NIC 306, and is capable of exchanging data. Data obtained through the NIC 306 can be displayed in the operating unit 304.

Configuration of Information Processing Apparatuses (Software)

Figure 4:
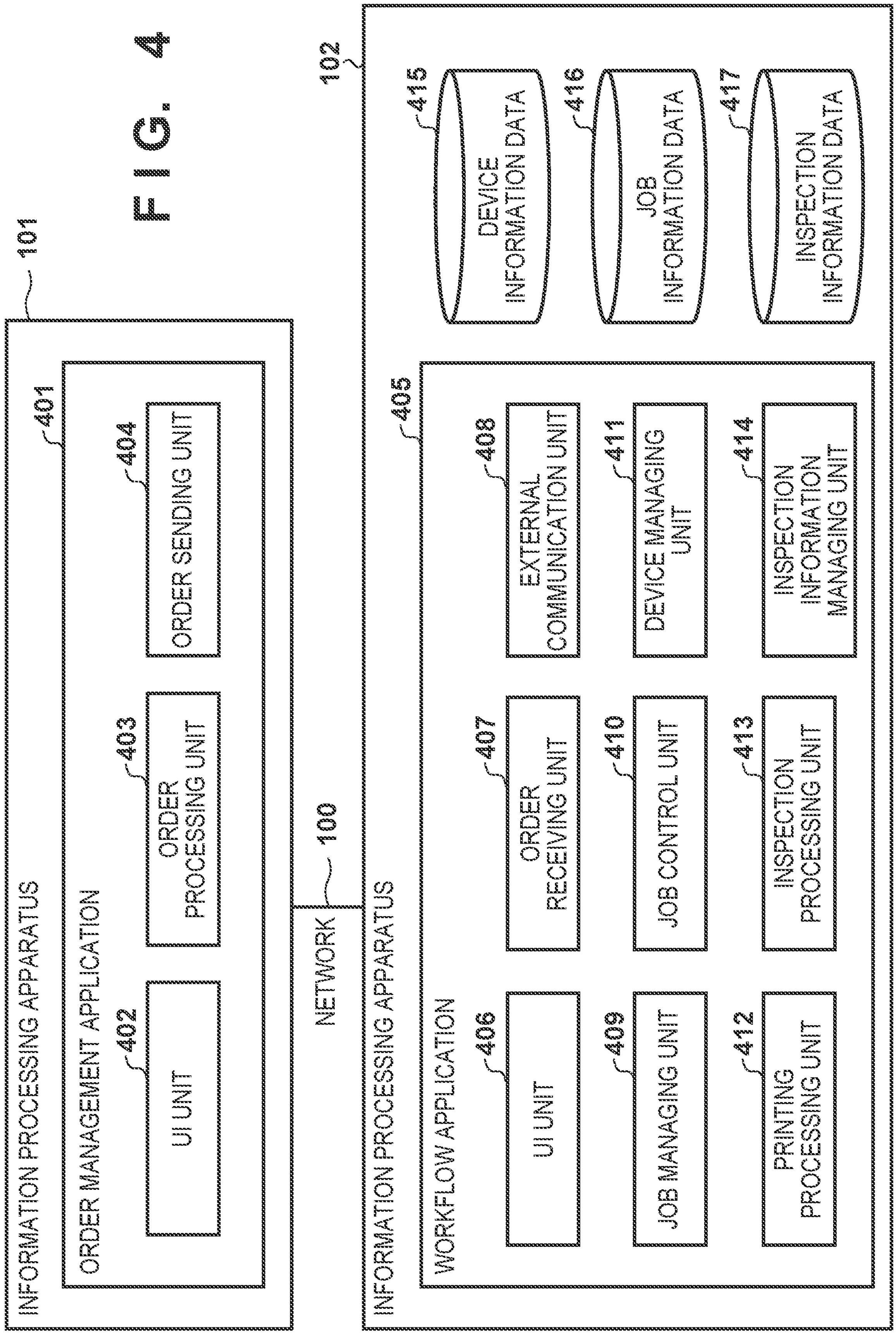
FIG. 4 is a diagram illustrating a software configuration according to the present invention.

FIG. 4 is a diagram illustrating the software configuration of the information processing apparatuses 101 and 102. An order management application 401 is a program module that is installed in and runs on the information processing apparatus 101, and during execution, is loaded into the RAM 203 and executed by the CPU 201. A UI unit 402 constructs a graphical user interface (GUI), accepts various input operations from a user, and instructs corresponding processing to be executed. An order processing unit 403 generates an order information list (described later) on the basis of order information input from the user via the UI unit 402. An order sending unit 404 sends the order information list (described later), which has been created by the order processing unit 403, to a workflow application 405 installed in the information processing apparatus 102, over the network 100.

The workflow application 405 is a program module that is installed in and runs on the information processing apparatus 102, and during execution, is loaded into the RAM 203 and executed by the CPU 201. A UI unit 406 constructs a graphical user interface (GUI), accepts various input operations from a user, and instructs corresponding processing to be executed. An order receiving unit 407 receives the order information list sent from the order sending unit 404 of the order management application 401, and performs processing for generating a print job from order details. The print job generation processing will be described in detail later. An external communication unit 408 receives information sent from an external device connected to the information processing apparatus 102, such as a barcode reader.

A job managing unit 409 manages the print job generated by the order receiving unit 407, and changes information of the print job according to various types of operations in the print job received from a job control unit 410, which will be described later. In accordance with input details from the user, made with respect to the print job and received from the UI unit 406, the job control unit 410 executes corresponding processing. A device managing unit 411 manages device information of the image forming apparatuses and the like, output by the workflow application 405. When the job control unit 410 instructs printing processing to be carried out for a print job, a printing processing unit 412 sends the corresponding print job to a designated image forming apparatus.

An inspection processing unit 413 receives, from the image forming apparatus, image data of a print result of the print job, sent by the printing processing unit 412, and determines whether or not the print result is normal. There are several methods for checking whether or not the print result is normal. For example, in one method, image data obtained by scanning the output medium of a print job (which has been output to a paper medium and determined to be normal through a visual inspection) using the image reading unit 307 of the image forming apparatus is prepared in advance, which is compared with image data read by the image capturing unit 313 during printing to determine the presence or absence of defects. In another method, a rasterized image of a print job generated by the external controller 105, the image forming apparatus, or the like is compared with image data read by the image capturing unit 313 during printing. In either method, an image formed on the surface of a sheet is optically read and digitized, and the print quality is evaluated by comparing that image to image data serving as a reference (called a "reference image", "reference image data", or the like). In the present embodiment, any inspection method may be used as long as the method automatically inspects the print result from the image forming apparatus. An inspection information managing unit 414 manages information pertaining to the inspection of the print job, such as an inspection result from the inspection processing unit 413.

Device information data 415 is a database storing various types of information of the image forming apparatus managed by the device managing unit 411, and stores information of an inspection condition table (described later; see FIGS. 8A and 8B) in addition to basic information such as a name, an IP address, and the like. Job information data 416 is a database that stores information of print jobs managed by the job managing unit 409, and stores print jobs to be printed by the workflow application 405, log information of printed print jobs that have been printed, and the like. Inspection information data 417 is a database storing print job inspection results managed by the inspection information managing unit 414, information pertaining to inspections (e.g., image data serving as a reference to inspecting print jobs), and the like.

Inspection Processing Sequence

Figures 1, 5A:
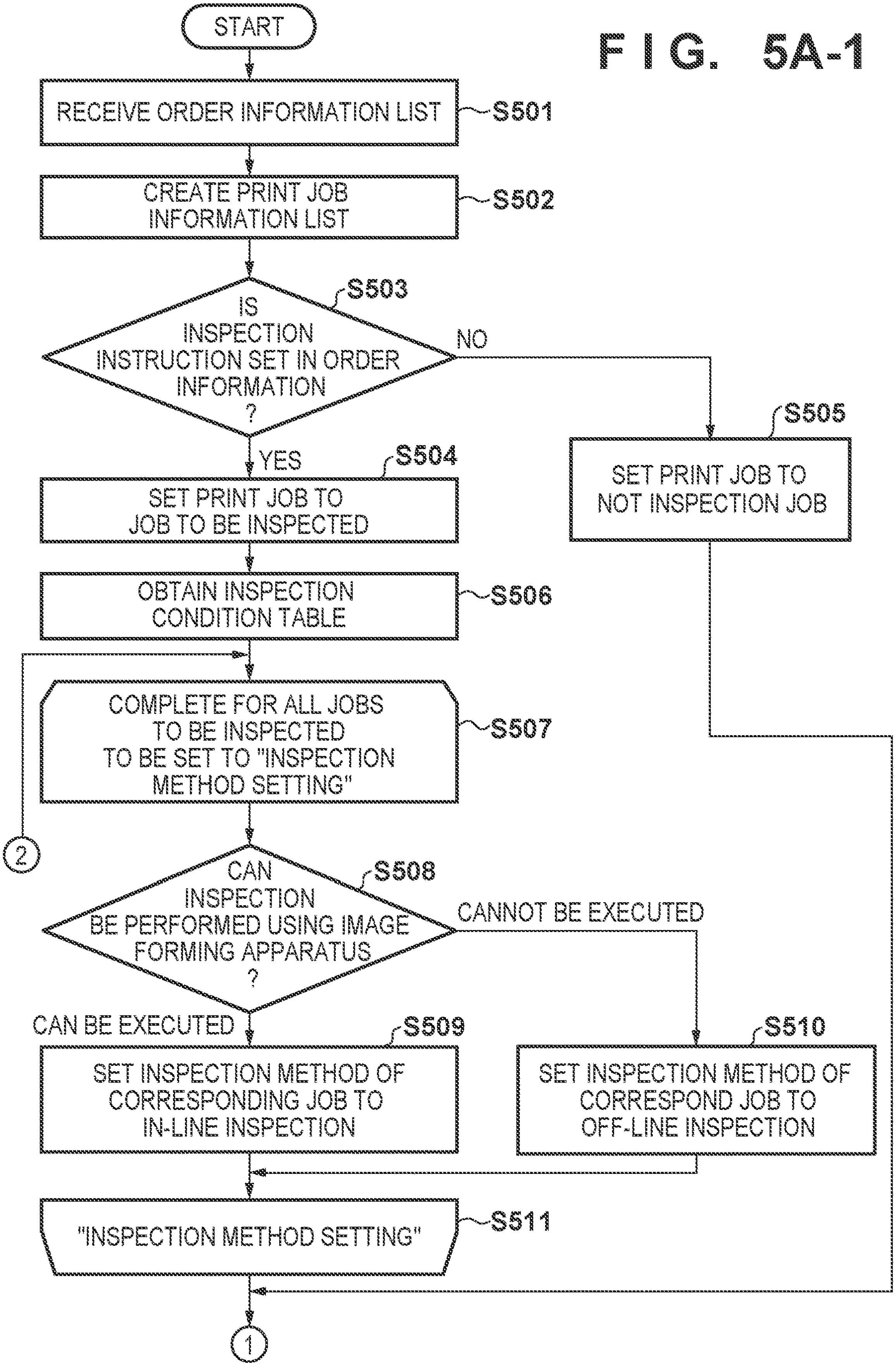
Figures 2, 5A:
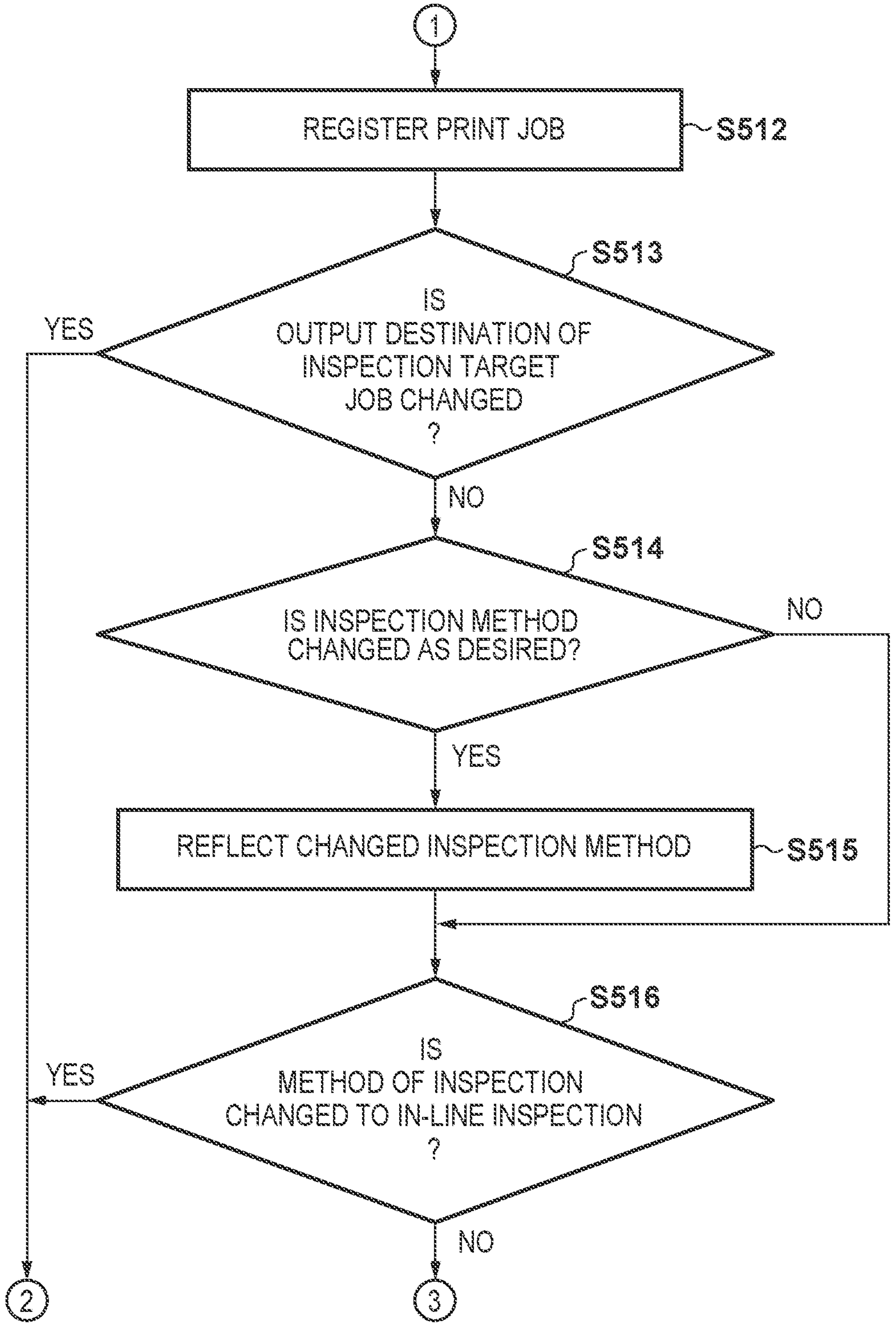
Figure 5B:
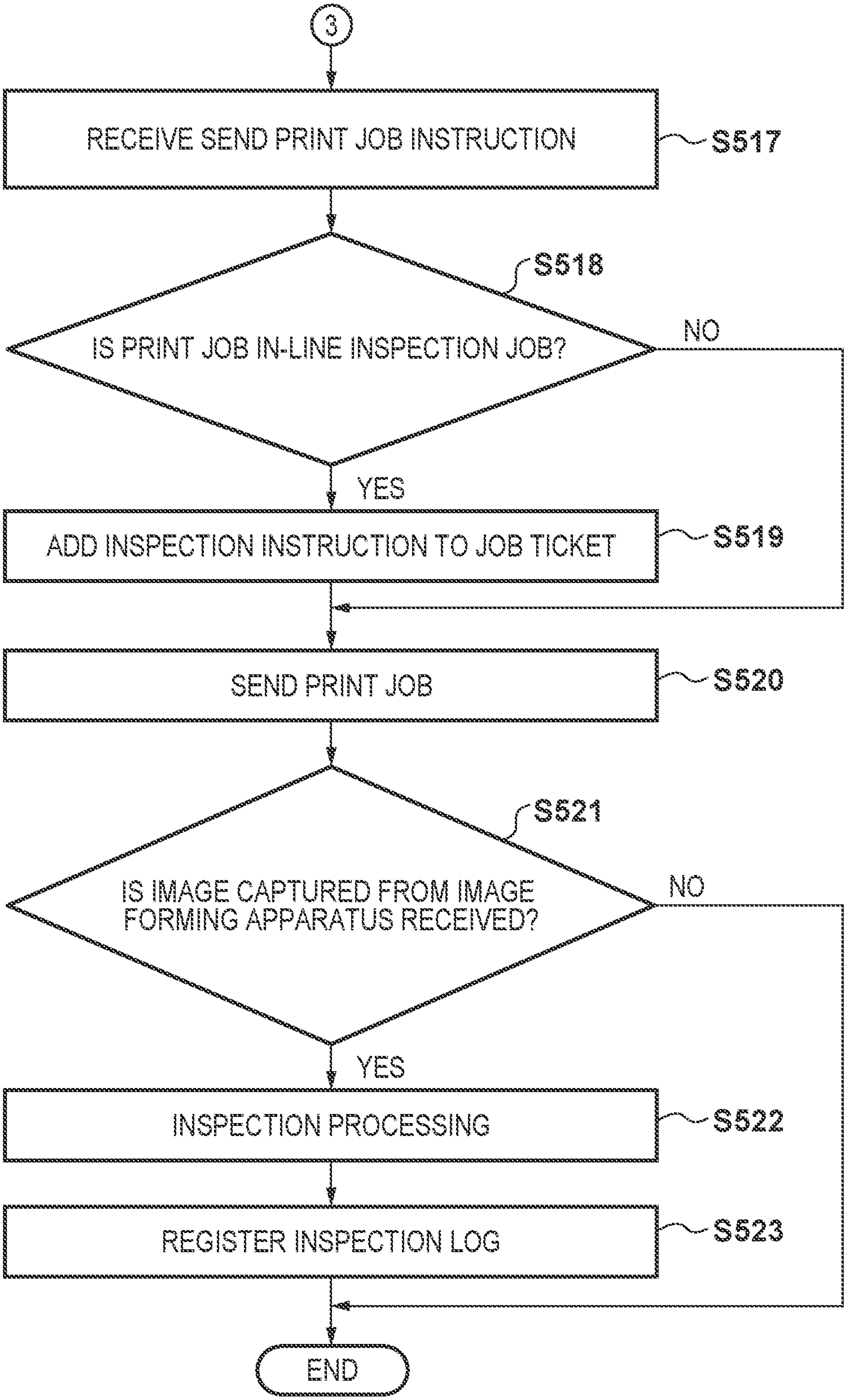
FIG. 5B is a flowchart illustrating inspection method setting processing according to the first embodiment of the present invention.

FIGS. 5A and 5B are flowcharts illustrating inspection setting processing and printing processing for a print job, performed by the workflow application. Each step in the processing will be described with reference to the order information list, a print job information list, and the inspection condition table illustrated in FIGS. 6, 7, 8A, and 8B, a UI screen of the workflow application illustrated in FIG. 9, and an example of a job ticket illustrated in FIGS. 10A and 10B. Note that FIGS. 5A and 5B are flows illustrating a continuous sequence of processing, and may therefore be referred to collectively as "FIG. 5" hereinafter. This sequence is executed mainly by the information processing apparatus 102. For descriptive purposes, a print job being focused on will be called a "print job of interest".

Step S501 is a processing step in which the order receiving unit 407 of the workflow application 405 receives the order information list sent from the order sending unit 404 of the order management application 401. FIG. 6 is a diagram illustrating an example of the order information list. "Order ID" is an ID, i.e., identification information, that uniquely identifies an order. "Customer name" is the name of the customer who requested the order. "Trade name" indicates an identifier specifying the product (deliverable) ordered by the customer. For example, "Book_A4_D_P" is an identifier that indicates a finished, A4-sized, perfect binding deliverable. "Number of copies" indicates the number of orders specified by the customer, and "paper type" indicates the type of the paper to be used. "Processing" indicates special processing to be used in the order, e.g., special effects, such as using invisible toner that changes color when exposed to UV light, hologram processing, or embossing. "Inspection" indicates whether or not there is a request for the deliverable to be inspected in the order. The value in "inspection" is set to "yes" when the customer wishes the item to be delivered after first being inspected to ensure that the item meets or exceeds a set standard of quality. "Data" indicates the filename, file path, and the like of content data used in the order.

The order sending unit 404 receives the input of the order information from a user via the UI unit 402, and then sends the order information list, which is created by the order processing unit 403 on the basis of the input order information, to the workflow application 405 over the network 100. The order receiving unit 407 of the workflow application 405 receives the order information list sent from the order sending unit 404 and expands the order information list in the RAM 203.

Step S502 is a processing step of analyzing the received order information list and creating the print job information list handled by the workflow application 405. The order receiving unit 407 analyzes the details of each order included in the order information list, creates print job information, and expands the print job information in the RAM 203. FIGS. 7A to 7C illustrate the print job information list created on the basis of the order information list illustrated in FIG. 6. In this processing step, the print job information list is created in an initial state, which is illustrated in FIG. 7A.

For example, for the order ID of "20190522001-001-001-001" in FIG. 6, a trade name of "Book_A4_D_P" is specified. In product information (not shown) defined in the workflow application 405 in advance, the trade name of "Book_A4_D_P" is constituted by two parts, namely "cover", with a paper size of SRA3, and "body", with a paper size of SAR4. Accordingly, a print job is generated for each of the components (job IDs of "001" and "002" in FIG. 7A). Items in the print job information list in FIG. 7A that have the same values as in the order information list in FIG. 6, such as "customer name", "trade name", and "number of copies", are carried over without changes. On the other hand, information defined in the product information (not shown), such as "print method" and "color", are set as appropriate on the basis of the definitions in the product information.

"Output destination" is information identifying the image forming apparatus which is to output the print job, and sets an image forming apparatus that accesses the device information data 415 via the device managing unit 411 and connects to the workflow application 405. When a plurality of image forming apparatuses are connected, the "output destination" may be set to an image forming apparatus set in advance as an initial value. Alternatively, the "output destination" may be set in accordance with a given condition (e.g., that the apparatus is a color machine, when the job involves color printing; a black-and-white machine, when the job involves black-and-white printing; and so on). It may be possible to set the output destination on the order management application 401 side, add information of the output destination to the order information list in FIG. 6, and make settings in the print job information list (FIG. 7A) on the basis of that information. "Inspection" and "inspection method" are set to undefined values in this processing step.

Step S503 is a processing step of determining whether or not an inspection request for performing an inspection is set in the received order information list. The order receiving unit 407 confirms the setting value of "inspection" in the received order information list, and if "yes" is set, the sequence moves to step S504. On the other hand, if "no" is set for "inspection" in the order information list, the sequence moves to step S505.

Step S504 is a processing step of setting the corresponding print job to be inspected. The order receiving unit 407 sets the value of "inspection" to "yes" in the print job information list corresponding to the order for which the setting value of "inspection" in the order information list is "yes" in step S503.

Step S505 is a processing step of setting the corresponding print job to not be inspected. The order receiving unit 407 sets the value of "inspection" to "no" in the print job information list corresponding to the order for which the setting value of "inspection" in the order information list is "no" in step S503. FIG. 7B illustrates the print job information list after the values of "inspection" have been set in steps S504 and S505. The values of "inspection" are input on the basis of the values of "inspection" in the order information list.

Step S506 is a processing step of obtaining information of an inspection condition table. The inspection condition table is a table that defines conditions for executing inspections in the image forming apparatus to which the workflow application 405 is connected. Each image forming apparatus has different inspection capabilities, and thus an inspection condition table is defined for each connected image forming apparatus. FIGS. 8A and 8B illustrate an example of the inspection condition table.

FIG. 8A illustrates the inspection condition table for an image forming apparatus (iPRCxxxxx), where conditions under which inspection cannot be executed are set in the table. For example, the image forming apparatus cannot execute inspections when the "paper type" is "embossed", "tabbed", and the like. Likewise, when a "grammage" of the paper is 200 gsm or more, the "paper size" is 330.2 mm×487.7 mm or more, and "special processing" is "special color", the inspection cannot be executed. FIG. 8B illustrates the inspection condition table for the image forming apparatus (VPxxxxx). The inspection condition table is stored in the device information data 415, obtained via the device managing unit 411, and temporarily expanded in the RAM 203 while this flowchart is being executed. The inspection condition table may be held in advance in a predefined format, or may be obtained from the connected image forming apparatus and created. Additionally, the inspection condition table may be in a format that defines conditions under which inspection can be executed, rather than a format that defines conditions under which inspection cannot be executed, as illustrated in FIGS. 8A and 8B. Additionally, although the paper type, grammage, paper size, and special processing are included as conditions in FIGS. 8A and 8B, only one or more of these conditions may be included, other conditions may be further included, or conditions aside from these may be included instead.

Steps S507 to S511 are processing steps for setting the "inspection method" in the print job information list, and these processing steps are executed as a loop for each print job registered in the print job information list. Steps S507 and S511 indicate that the process exits the loop once the processing is finished for all the print jobs in the print job information list having handled each print job in sequence.

Step S508 is a processing step of determining whether or not inspection can be performed for the print job of interest using the inspection apparatus of the image forming apparatus. The job managing unit 409 reads out the device information data 415 corresponding to the output destination of that print job from the RAM 203 via the device managing unit 411, and determines whether or not inspection can be performed on the basis of various settings of the print job. For example, the "output destination" is "iPRCxxxxx" for the job ID of "0001" in the print job information list illustrated in FIG. 7B. Accordingly, referring to the information in the inspection condition table illustrated in FIG. 8A, it is determined whether or not the settings in the print job, i.e., "paper size", "paper type", "processing", and so on, correspond to conditions for which the inspection cannot be performed. The settings for the job ID of "0001" do not match the conditions defined in the inspection condition table, and it is therefore determined that the job with the job ID "0001" can be inspected using the inspection apparatus of the image forming apparatus "iPRCxxxxx". On the other hand, a "paper type" of "embossed", which is defined as a condition for which inspection cannot be performed in the inspection condition table (FIG. 8A) of the "output destination" of "iPRCxxxxx", is set for the job ID of "0003". As such, it is determined that inspection cannot be performed using the inspection apparatus of the image forming apparatus "iPRCxxxxx". Hereinafter, in the present specification, inspections performed using the inspection apparatus of the image forming apparatus will be referred to as "in-line inspections", and inspections performed without using the inspection apparatus of the image forming apparatus (e.g., visual inspections, using an off-line colorimeter, or the like) will be referred to as "off-line inspections". The sequence moves to step S509 when it is determined that in-line inspection can be performed, and moves to step S510 when it is determined that in-line inspection cannot be performed and off-line inspection is to be performed.

Step S509 is a processing step of setting the "inspection method" to "in-line inspection" for the print job for which it has been determined that in-line inspection can be executed. The job managing unit 409 sets the "inspection method" to "in-line inspection" for the job ID of the print job for which it has been determined that in-line inspection can be executed.

Step S510 is a processing step of setting the "inspection method" to "off-line inspection" for the print job for which it has been determined that in-line inspection cannot be executed. The job managing unit 409 sets the "inspection method" to "off-line inspection" for the job ID of the print job for which it has been determined that in-line inspection cannot be executed.

Step S511 indicates the end of the loop processing performed for each print job, and if the processing is finished for all the print jobs in the print job information list, the sequence moves to step S512. If a print job for which the processing is not finished remains, the processing of steps S508, S509, and S510 is executed for the print job for which the processing is not finished. FIG. 7C illustrates the print job information list for a state in which the processing of steps S508, S509, and S510 has been executed for all of the print jobs in the print job information list illustrated in FIG. 7B. The "inspection method" is set for all of the print jobs to be inspected.

Step S512 is a processing step of registering the print job in the workflow application 405 on the basis of the generated print job information list. The job managing unit 409 stores the print job information list, which has been generated in the RAM 203, in the job information data 416. The job managing unit 409 accesses the print job information list of the job information data 416, and displays the print job in the UI screen of the workflow application 405 via the UI unit 406.

FIG. 9 illustrates an example of the user interface (UI) screen of the workflow application 405. A screen 901 indicates a main window of the workflow application 405. A region 902 indicates a menu button area in which buttons for executing various types of functions are arranged. A button 903 is a print button for sending a print job. A button 904 is a log button for displaying the log information of the print job in the workflow application. A button 905 is a delete button for deleting a print job. A list 906 is a print job list which lists the print jobs to be printed. A button 907 is a drop-down button for manually changing the setting value for "inspection method" in a print job. When the drop-down button 907 is pressed, options for designating the inspection method (in-line, off-line, none) are displayed, and can be changed as desired by the user. A button 908 is a drop-down button for manually changing the setting value for "output destination" in a print job. When the drop-down button 908 is pressed, the image forming apparatuses to which the workflow application 405 is connected are displayed as options, and the user can change the "output destination" as desired.

A region 909 is a device list region that lists the image forming apparatuses connected through the workflow application 405. An icon 910 indicates an image forming apparatus to which the workflow application 405 is connected. The print job list 906 is an example displayed on the basis of the print job information list illustrated in FIG. 7C. All of the setting items present in the print job information list need not be displayed in the print job list 906. For example, because the printing operator need not be aware of "data" (the filename of content data) in the print job information list, it may be possible to set such items to not be displayed in the UI screen. On the other hand, setting values not present in the print job information list may be additionally displayed. For example, "status" in the job list 906 indicates a status of the print job. Statuses include "ready", which indicates that the print job can be sent, "sending error", which indicates an error in the print job which has been sent, and so on. The status is designed to display additional items that change dynamically depending on the state of the workflow application 405.

Step S513 is a processing step of determining whether or not the output destination of the print job to be inspected has been changed. When the drop-down button 908 is operated and the UI unit 406 receives an instruction to change the image forming apparatus serving as the output destination, the image forming apparatus of that print job is changed via the job control unit 410. The job control unit 410 accesses the print job information list via the job managing unit 409, and changes the value of the "output destination" of the corresponding print job to the value of the image forming apparatus following the change. The job managing unit 409 refers to the print job information list, and determines whether or not the value of "inspection" is "yes" for the print job for which the "output destination" has been changed. If the value of "inspection" is "yes" for the print job, the sequence moves to step S507, where the processing steps for setting the inspection method, described earlier, are executed on the basis of the inspection conditions of the post-change image forming apparatus. In all other cases, the sequence moves to step S514.

Step S514 is a processing step of determining whether or not the inspection method of the print job has been changed. When the drop-down list (907) is operated and the UI unit 406 receives an instruction to change the "inspection method", it is determined that a change in the inspection method of the print job has been received, and the sequence moves to step S515. In all other cases, the sequence moves to step S517.

Step S515 is a processing step of executing the change of the inspection method of the print job, received in step S514. The job control unit 410 receives the post-change value of the inspection method, received from the UI unit 406, and updates the value of "inspection method" for the corresponding print job in the print job information list to the post-change value via the job managing unit 409.

Step S516 is a processing step of determining whether or not the inspection method changed in step S515 is "in-line". If the inspection method has been changed from "none" or "off-line" to "in-line", the sequence moves to step S507, where the processing steps for setting the inspection method, described earlier, are executed again. In all other cases, the sequence moves to step S517 (FIG. 5B).

Step S517 is a processing step of receiving an instruction to send a print job to the image forming apparatus serving as the output destination. When the print button 903 is pressed, the UI unit 406 instructs the job control unit 410 to perform print job sending processing. Upon accepting the instruction to perform the print job sending processing, the job control unit 410 receives the information of the print job selected to be sent via the UI unit 406, sets the received print job to be sent, and instructs the printing processing unit 412 to send the print job.

Step S518 is a processing step of determining whether or not the "inspection method" of the print job to be sent is "in-line". The printing processing unit 412 obtains the setting value of the "inspection method" of the print job from the print job information list via the job managing unit 409. If the "inspection method" of the print job is "in-line", i.e., if there is an inspection request and the inspection can be performed, the sequence moves to step S519. On the other hand, if the "inspection method" is "off-line", i.e., if there is a print request but inspection cannot be performed, or if inspection is not to be performed, i.e., there is no inspection request, the sequence moves to step S520.

Figure 10A:
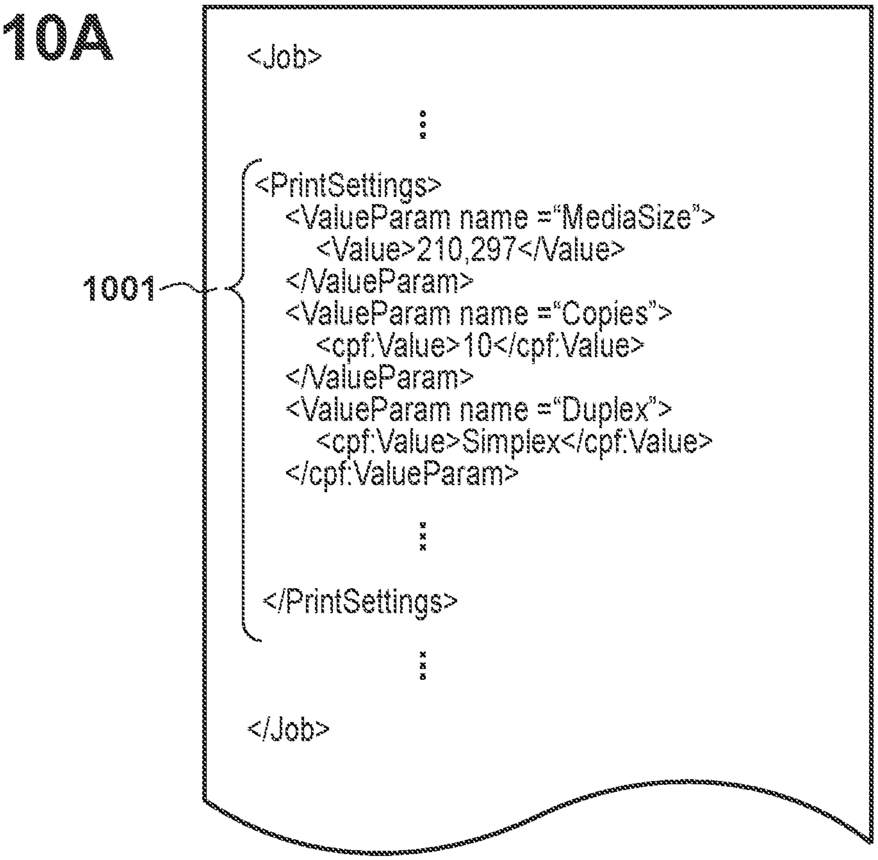
FIGS. 10A and 10B are diagrams illustrating an example of a job ticket.
Figure 10B:
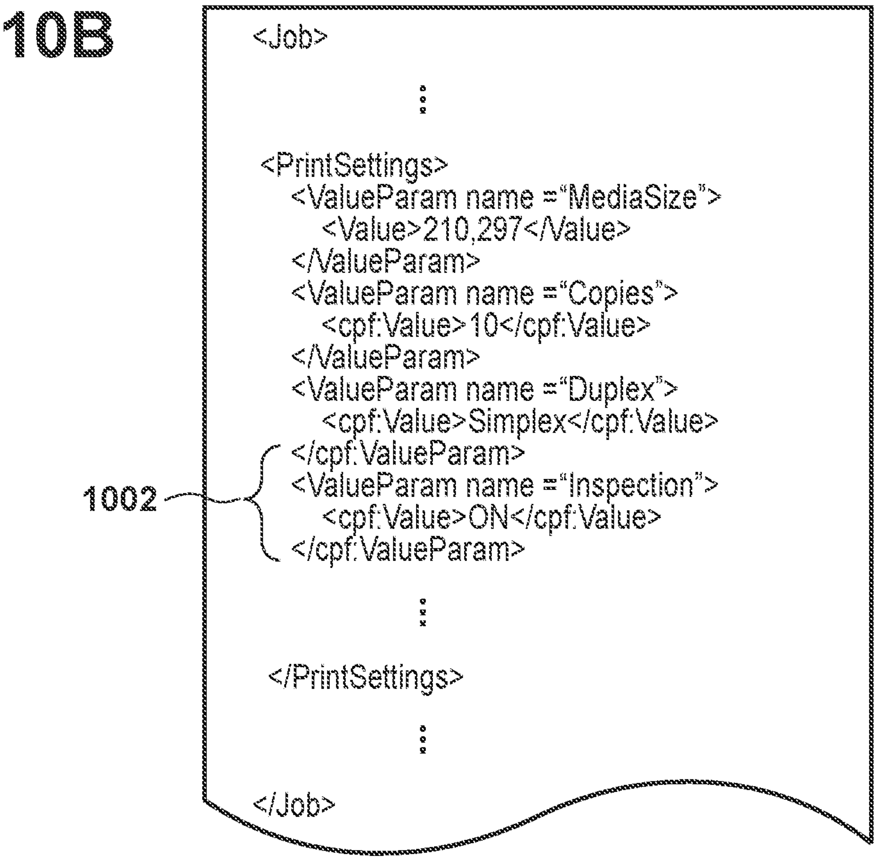

Step S519 is a processing step of adding a description instructing inspection to be executed (i.e., an inspection instruction) to a job ticket including the setting details of the print job sent to the image forming apparatus. When it is determined in step S518 that the "inspection method" of the print job is "in-line", the printing processing unit 412 adds a description indicating that inspection is to be performed using the inspection apparatus of the image forming apparatus, i.e., an inspection instruction, to the job ticket to be sent. FIGS. 10A and 10B illustrate an example of a job ticket. FIG. 10A illustrates the job ticket from before the processing of step S519 is executed. Various types of print settings of the print job are defined in a tag <PrintSettings> 1001. For example, "Copies" indicates a parameter for the number of copies, and the value thereof is set to "10 copies", and "Duplex" indicates a parameter for simplex or duplex printing, and the value thereof is set to "Simplex=single-sided". FIG. 10B illustrates the job ticket from after the processing of step S519 is executed. "Inspection" 1002 indicates a parameter for executing the inspection in the image forming apparatus, and setting the value thereof to "on" functions as an instruction to execute the inspection. No parameter for "Inspection" 1002 or the value thereof being "off" functions as an instruction to not execute the inspection. Here, the job ticket may be in a proprietary format or an industry-standard format (e.g., JDF) as long as the format makes it possible to provide instructions to the image forming apparatus. If the value is "on" for the "Inspection" tag 1002 included in the received print job (and in the job ticket in particular), the image forming apparatus uses the inspection apparatus to capture the image formed on the sheet, and sends the captured image to the information processing apparatus 102. Note that the imaging instruction is not limited to the "Inspection" tag, and may instead be performed by turning on other parameters, such as a "PrintedImage" tag.

Step S520 is a processing step of sending the print job to the image forming apparatus set as a sending destination of the print job. The printing processing unit 412 sends the content data and the job ticket data of the print job in question to the image forming apparatus designated as the output destination.

Step S521 is a processing step of determining whether or not the workflow application 405 has received image data obtained by the image capturing unit 313 reading the paper medium printed by the image forming apparatus. Upon receiving a job ticket including an inspection execution instruction, the image forming apparatus uses the image capturing unit 313 to capture an image of the output printed by the printing unit 308 via the apparatus control unit 302, and sends the obtained image data to the workflow application 405. If the inspection processing unit 413 of the workflow application 405 has received the image data from the image forming apparatus, the sequence moves to step S522, whereas if the image data is not received (if inspection is not to be executed using the inspection apparatus of the image forming apparatus), the processing step ends.

Step S522 is a step of performing inspection processing. In other words, step S522 is a processing step of determining whether or not the print result is normal on the basis of the image data received from the image forming apparatus, e.g., on the basis of whether or not the quality of the printed image meets a predetermined standard. The inspection processing unit 413 compares the image data received from the image forming apparatus with image data serving as a reference and determines whether there is a defect in the image. As described earlier, the image data serving as a reference may be image data obtained by performing a trial print in advance and scanning an output medium determined to be normal through a visual inspection, a rasterized image based on print job data generated by the external controller, an image forming apparatus, or the like, and so on. To take image defects as an example, items for quality evaluation are missing barcodes or ruled lines, dropped images, printing defects (black spots, streaks, and the like), missing pages, color shifts, and the like.

Step S523 is a processing step of recording the image data received from the image forming apparatus and the inspection result from step S522 as log data. The inspection information managing unit 414 stores the image data received in step S521 and the inspection result from step S522 in the inspection information data 417 in association with the print job information sent in step S520. For example, a print job having a "job ID" of "0001" in FIG. 7C has 10 copies of a single-sided cover (one page). Accordingly, 10 pages of image data are stored in association with each other, and for each copy, information such as the presence/absence of defects, and if there are defects, the location and details of the defects, are stored.

Inspection Log

Figure 13B:
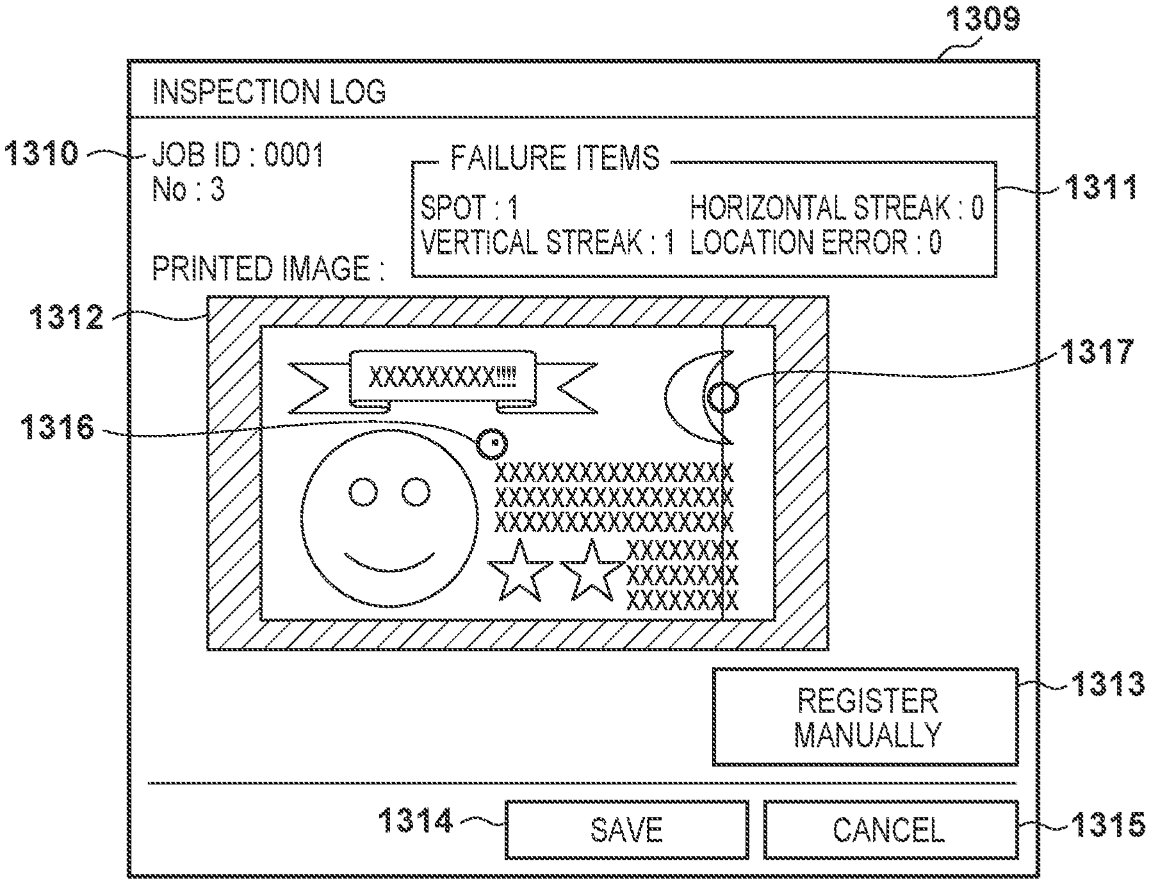
FIG. 13B is a diagram illustrating an example of an inspection log screen.

FIG. 13A illustrates a print log screen displaying the log information of the print job. This screen is displayed when a target print job is selected in the print job list 906 of the main window 901 of the workflow application 405 and the log button 904 is pressed. A screen 1301 indicates the print log screen. A region 1302 indicates the job ID of the print job displayed in the print log screen. A region 1303 indicates a total number of copies and a number of printing errors for the print job. A region 1304 indicates a total number of inspections, the inspection method (in-line or off-line), and the number of inspection failures (i.e., not meeting the standard). A list 1305 indicates a print log list displaying each print log in a list. A print time, print result, inspection result, and the like is displayed for each copy. A button 1306 is an inspection log details button, and is a button for displaying more detailed inspection results (the inspection log screen illustrated in FIG. 13B) for the print log selected in the print log list. A button 1307 is a barcode input button. Pressing the barcode input button 1307 transitions to a barcode input mode, where a barcode printed on an output printed material is read by a barcode reader (not shown). By doing so, an inspection log screen for registering an inspection log corresponding to the output (FIG. 13B) can be displayed automatically. A button 1308 is a button for closing the print log screen.

FIG. 13B illustrates the inspection log screen, which displays a detailed log for each copy in the print job. A screen 1309 indicates the inspection log screen. A region 1310 indicates the job ID and copy number of the print job displayed in the inspection log screen. A region 1311 indicates a failure item list, and displays a list of detected inspection failure items and numbers thereof. A region 1312 indicates an area in which a printed image is displayed, and displays details of printed image data captured by the inspection apparatus of the image forming apparatus. Note that when the print job is constituted by a plurality of pages, images of the plurality of pages are displayed in the printed image area 1312 in a format which allows the pages to be cycled through. A button 1313 is a manual registration button for manually registering the inspection log. When the manual registration button 1313 is pressed, the presence of soiling, such as dust or streaks, in a specified location of the image data displayed in the printed image area 1312 can be registered manually. A button 1314 is a save button for saving the details edited in the inspection log screen and closing the screen. A button 1315 is a cancel button for closing the inspection log screen without saving the details that have been edited. Indicators 1316 and 1317 are indicators indicating failure items detected through the inspection process. The indicator 1316 indicates the presence of a black spot, and the indicator 1317 indicates the presence of a vertical streak. For example, with a print job on which in-line inspection has been executed, the details of the inspection result in the print log list 1305 of FIG. 13A and the inspection log screen of FIG. 13B have been input automatically from the inspection result of step S522.

Through the processing described above, it can be determined whether or not a print job to be inspected can be inspected using the inspection apparatus of the image forming apparatus serving as the output destination, and the inspection can be executed using the inspection apparatus of the image forming apparatus only when the settings make it possible to perform the inspection. This makes it possible to prevent situations where a print job not suited to inspection using the inspection apparatus of the image forming apparatus is mistakenly inspected, producing a large amount of output determined to be defective. Although the present embodiment describes a configuration in which the image data is generated by the image forming apparatus and the processing for inspecting for print defects is performed by the workflow application 405, the configuration may be such that the inspection processing is also executed in the image forming apparatus.

Second Embodiment

A second embodiment of the present invention will be described next. Configurations which are the same as in the first embodiment will not be described. The second embodiment will describe processing which makes it possible to register image data captured by an image forming apparatus in an inspection log, even for off-line inspection print jobs, for which in-line inspections are not executed.

Inspection Processing Sequence

Figure 11:
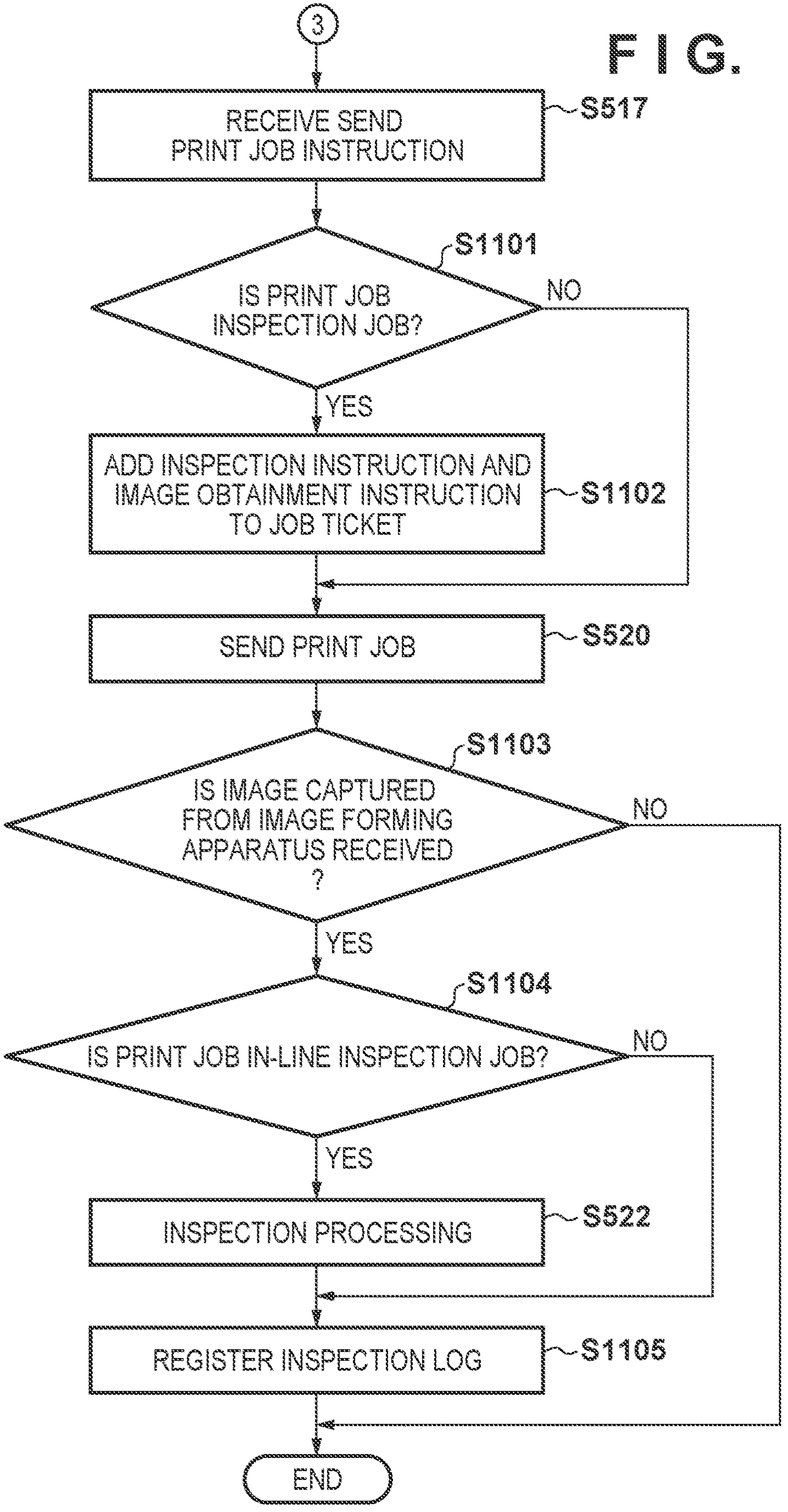
FIG. 11 is a flowchart illustrating inspection method setting processing according to a second embodiment of the present invention.

FIG. 11 is a flowchart illustrating inspection setting processing and printing processing for a print job, performed by the workflow application. Note that FIG. 11 illustrates a sequence executed in the present embodiment instead of the sequence described in the first embodiment with reference to FIG. 5B, and is a continuation of FIGS. 5A-1 and 5A-2, and thus the sequence illustrated in FIGS. 5A-1 and 5A-2 will not be described here. Additionally, in FIG. 11, processes that are the same as in FIG. 5B of the first embodiment will be given the same reference signs, and will not be described. When the setting of the print job information list in FIGS. 5A-1 and 5A-2 is complete, in step S517, an instruction to send the print job to the image forming apparatus serving as the output destination is received.

Step S1101 is a processing step of determining whether or not the print job to be sent is to be inspected. The printing processing unit 412 obtains the setting value of the "inspection method" of the print job from the print job information list via the job managing unit 409. If the "inspection method" of the print job is "in-line" or "off-line", the sequence moves to step S1102, and if the print job is not to be inspected, the sequence moves to step S520.

Step S1102 is a processing step of adding a description instructing inspection to be executed and a printed image to be captured to a job ticket including the setting details of the print job sent to the image forming apparatus. When it is determined in step S1102 that the "inspection method" of the print job is "in-line", the printing processing unit 412 adds a description indicating that inspection is to be performed using the inspection apparatus of the image forming apparatus to the job ticket to be sent. Furthermore, when it is determined in step S1102 that the print job is to be inspected ("in-line" or "off-line"), the printing processing unit 412 adds a description indicating that the printed image is to be captured using the inspection apparatus of the image forming apparatus to the job ticket to be sent.

Figure 12A:
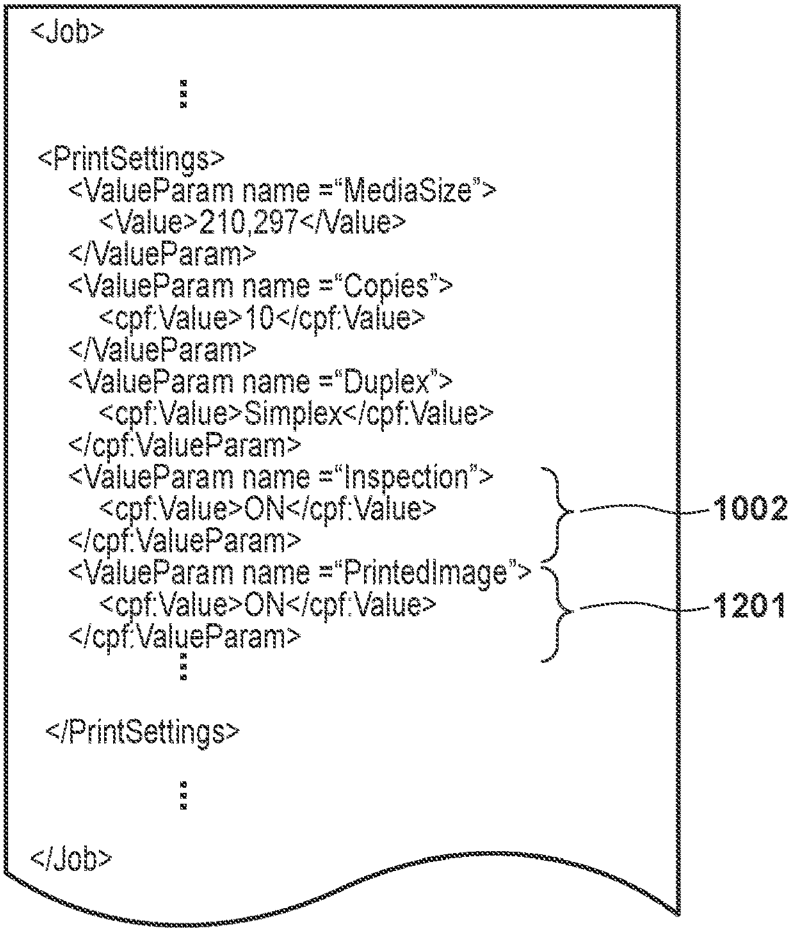
FIGS. 12A and 12B are diagrams illustrating an example of a job ticket.
Figure 12B:
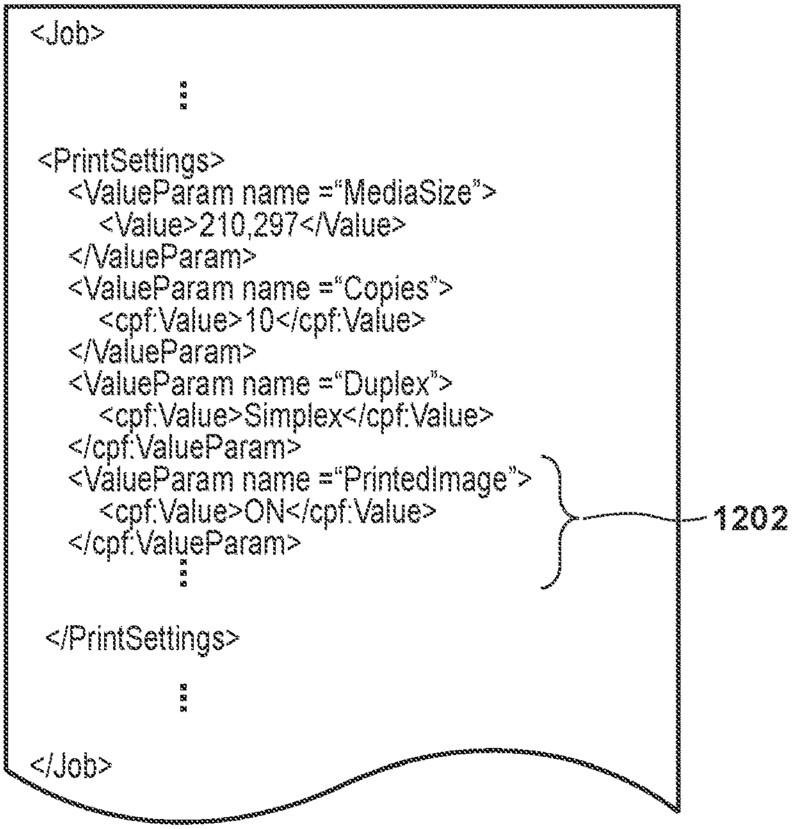

FIGS. 12A and 12B illustrate an example of a job ticket. FIG. 12A illustrates an in-line inspection job ticket, and FIG. 12B indicates an off-line inspection job ticket. In this processing step, with the in-line inspection job ticket, in-line inspection is designated in the parameter "Inspection" 1002, as illustrated in FIG. 12A. Furthermore, a parameter "PrintedImage" 1201, which serves as an instruction to capture a printed image using the inspection apparatus of the image forming apparatus, has been added. When in-line inspection is executed, the printed image is captured by the inspection apparatus of the image forming apparatus, and thus the value of the parameter "PrintedImage" 1201 is "on". In the off-line inspection job ticket (FIG. 12B), the parameter "Inspection" 1002, which instructs the execution of in-line inspection as indicated in FIG. 12A, is not specified. However, the value of the parameter "PrintedImage" 1202, for capturing a printed image using the inspection apparatus of the image forming apparatus, is set to "on". In this manner, in the present embodiment, when the print job is to be inspected, an instruction to capture the printed image is set in the print job. Along with this, information for identifying in-line inspections and off-line inspections, i.e., information indicating whether or not the inspection condition has been met, is set in the print job as well. Meeting the inspection condition refers to meeting the conditions indicated in FIGS. 8A and 8B, in which case an off-line inspection is performed; if not, an in-line inspection is performed. A print job which is not to be inspected, a print job for which the settings pertaining to inspection are complete, and the like are sent to the image forming apparatus in step S520.

Step S1103 is a processing step of determining whether or not the workflow application 405 has received image data obtained by the image capturing unit 313 reading the paper medium printed by the image forming apparatus. Upon receiving the job ticket having an instruction for capturing the printed image using the image forming apparatus, the image forming apparatus uses the image capturing unit 313 to capture an image of the output printed by the printing unit 308 via the apparatus control unit 302. The obtained image data is then sent to the workflow application 405. If the inspection processing unit 413 of the workflow application 405 has received the image data from the image forming apparatus, the sequence moves to step S1104, but if the image data is not received, this processing step ends.

Step S1104 is a processing step of determining whether or not the "inspection method" of the print job to be sent is "in-line". The printing processing unit 412 obtains the setting value of the "inspection method" of the print job from the print job information list via the job managing unit 409. If the "inspection method" of the print job is "in-line", the sequence moves to step S522 and the inspection processing is executed, whereas if the "inspection method" is "off-line", the sequence moves to step S1105.

Step S1105 is a processing step of recording the image data received from the image forming apparatus and the inspection result from step S522 as log data. The inspection information managing unit 414 stores the image data received in step S1103 and the inspection result from step S522 in the inspection information data 417 in association with the print job information sent in step S520. Regarding the off-line inspection print job, the inspection result information in step S522 is not present, and thus only the image data is stored in association with the print job.

Inspection Log

The inspection log according to the present embodiment is the same as that described in the first embodiment with reference to FIGS. 13A and 13B, in terms of the details of the log. However, in the present embodiment, an image formed on the sheet surface can be captured even for print jobs which are subject to off-line inspection, and the captured image can be saved in association with the job information. For an off-line inspection print job, the inspection result in the print log list 1305 in FIG. 13A and the details of the inspection log screen in FIG. 13B are not input. However, the printed image data captured by the inspection apparatus of the image forming apparatus are in a registered state, and thus the printed image data can be displayed in the printed image area 1312 of the inspection log screen of FIG. 13B for each copy. Accordingly, the output printed material can be inspected through a visual inspection or using an off-line inspection apparatus or the like, and the inspection log can be registered manually using the function of the manual registration button 1313.

Through the processing described above, the printed image data can be managed by the workflow application 405 for off-line inspection print jobs as well. The workflow application 405 can then manage the inspection logs in a centralized manner, for both in-line inspection and off-line inspection print jobs.

Third Embodiment

A third embodiment of the present invention will be described next. Configurations which are the same as in the first and second embodiments will not be described. The third embodiment will describe processing that makes it possible for the determined inspection method to be output to instructions or the like, for a print job for which the inspection method is determined to be in-line or off-line.

Inspection Processing Sequence

Figure 14:
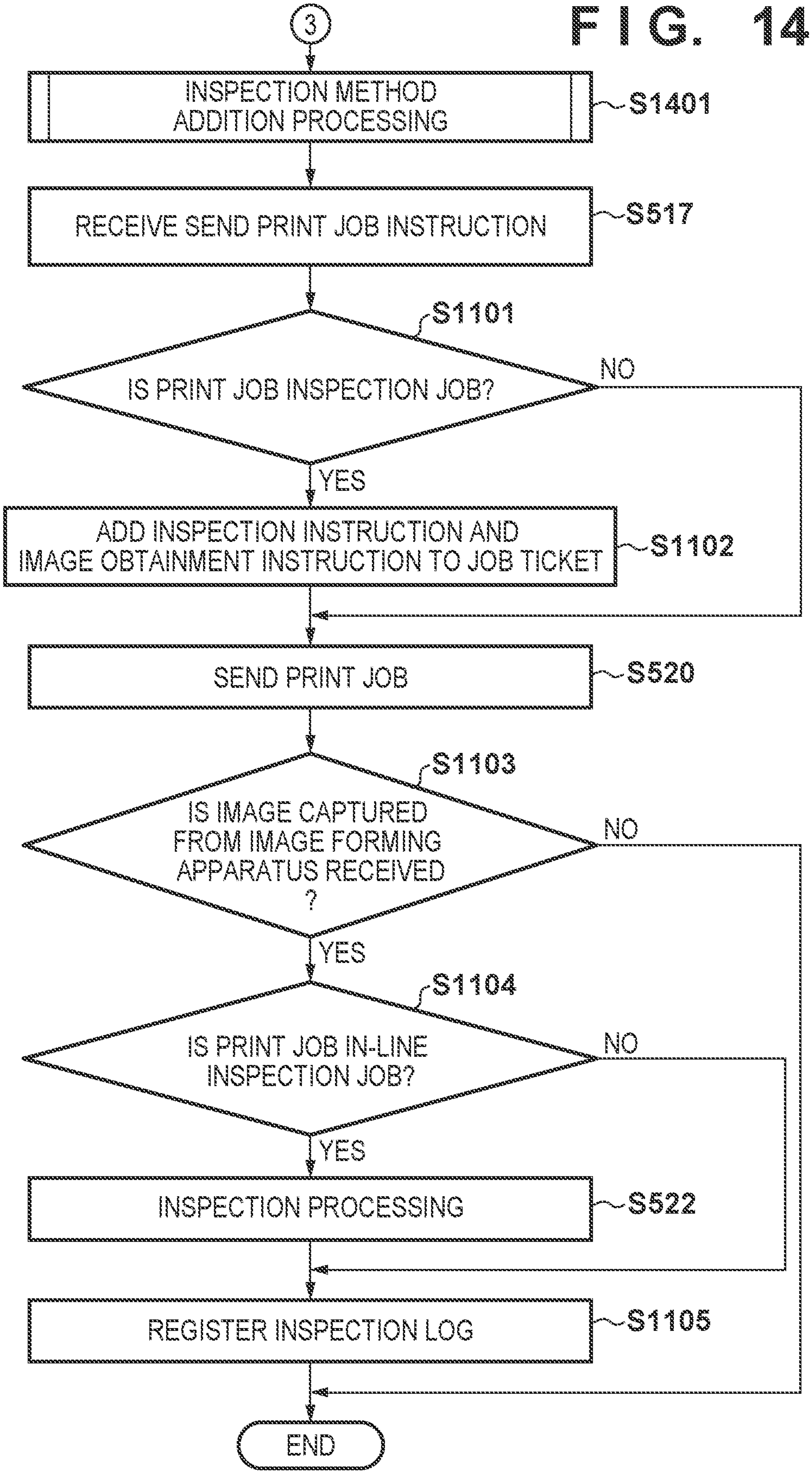
FIG. 14 is a flowchart illustrating inspection method setting processing according to a third embodiment of the present invention.

FIG. 14 is a flowchart illustrating inspection setting processing and printing processing for a print job, performed by the workflow application. Note that FIG. 14 is also a continuation of FIGS. 5A-1 and 5A-2. Processes that are the same as in FIGS. 5-1 and 5A-2, described in the first embodiment, and FIG. 11, described in the second embodiment, will be given the same reference signs, and will not be described.

In the present embodiment, step S1401 is executed before step S517 of FIG. 11. Step S1401 is a processing step for adding the inspection method set by the workflow application 405 in printed material such as instructions. The processing step will be described in detail using the flowchart in FIG. 15.

Figure 15:
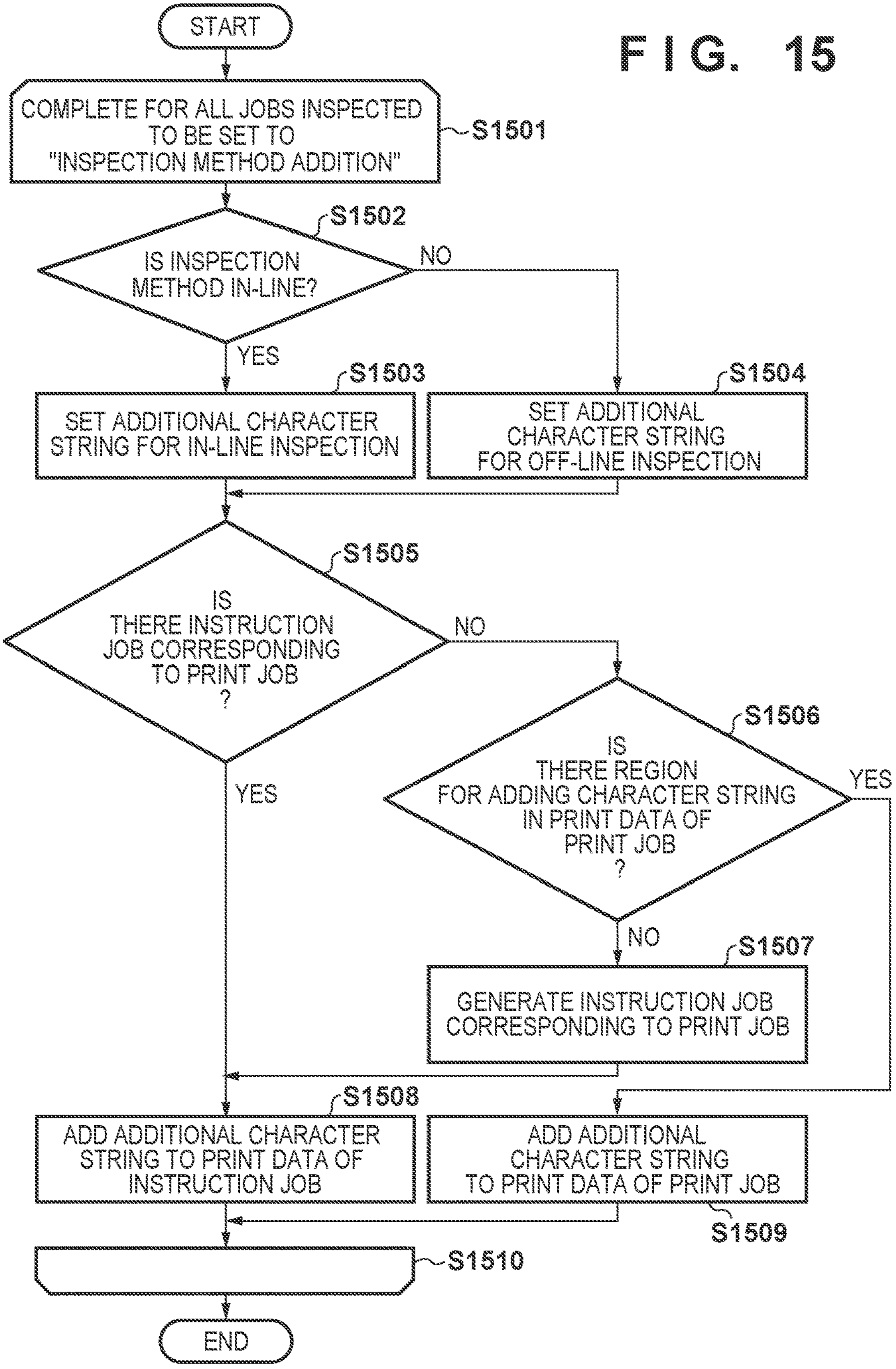
FIG. 15 is a flowchart illustrating inspection method addition processing.

FIG. 15 is a flowchart illustrating processing for adding the inspection method to printed material such as instructions. Each processing step will be described hereinafter. Steps S1501 to S1510 are processing steps for adding the inspection method to printed material such as instructions, and the processing steps are executed as a loop for each print job which is to be inspected. Steps S1501 and S1510 are steps indicating that the print job to be inspected is subject to the processing, and indicate that the loop is to be exited once the processing is finished for all the print jobs to be inspected, having handled each print job in sequence.

Step S1502 is a processing step of determining whether or not the "inspection method" of the print job of interest is "in-line". The job managing unit 409 obtains the setting value of the "inspection method" of the print job from the print job information list. If the "inspection method" of the print job is "in-line", the sequence moves to step S1503, but if the "inspection method" is "off-line", the sequence moves to step S1504.

Step S1503 is a processing step of setting an additional character string for in-line inspection. The job managing unit 409 temporarily sets an additional character string for the in-line inspection print job, to be added to the instructions or the like, in the RAM 203. Here, the "additional character string" is a character string that, by being added to the instructions or the like, enables the printing operator to determine, when processing the printed output, whether the output has been inspected through in-line inspection, or whether off-line inspection is necessary. As long as this purpose can be achieved, the character string may be in a format fixed for the system, or may be capable being set as desired by the user. In the present embodiment, the character string for in-line inspection is "inspected with image forming apparatus", and the character string for off-line inspection (mentioned later) is "must be inspected after printing". In step S1503, the character string "inspected with image forming apparatus" is temporarily set in the RAM 203. Step S1504 is a processing step of setting an additional character string for off-line inspection. The job managing unit 409 temporarily sets an additional character string for off-line inspection ("must be inspected after printing"), added to the instructions or the like, in the RAM 203.

Step S1505 is a processing step of determining whether or not an instruction job corresponding to that print job is present. The job managing unit 409 accesses the print job information list and determines whether or not an instruction job is present for that print job. FIG. 16 is a diagram illustrating an example of a print job information list including an instruction job. The "component" of "WI" indicates that the job is an instruction job, and the "job ID" of "0003" indicates instructions for an "order ID" of "20190522002-002-001". For example, the "job ID" of "0004" indicates a job to be inspected, and the "order ID" is "20190522002-002-001", and thus it is checked whether instructions having the same order ID are present. The "job ID" of "0003" is found as instructions having the same order ID, and thus the "job ID" of "0004" is determined to be a print job for which an instruction job is present. On the other hand, if an instruction job cannot be found, it is determined that there is no instruction job for the print job. If an instruction job is present, the sequence moves to step S1508, whereas if an instruction job is not present, the sequence moves to step S1506.

Step S1506 is a processing step of determining whether or not there is a region for adding a character string in the print data of the print job. In some cases, print data is created by imposing content data (including margin regions to account for cutting errors and the like) on a large sheet of paper to allow for post-processing (cutting, folding, and the like). In such a case, margins will be present outside the region of the content that is the actual deliverable. The job managing unit 409 obtains imposition information of the print job (the output paper size, the positions where content is arranged, and the like) from the print job information list, and calculates a region for margins outside the region of the content. Then, the job managing unit 409 determines whether or not a region required for laying out the aforementioned additional character string is present. If it is determined that the additional character string can be laid out, the sequence moves to step S1509, and if it is determined that the additional character string cannot be laid out, the sequence moves to step S1507. Here, there are also cases where other content, such as barcodes or color charts, are added in the margins outside the content region, and thus it is determined whether or not a region for laying out the additional character string is present having taken into account layout regions for such content as well.

Step S1507 is a processing step of generating an instruction job corresponding to the print job. The job managing unit 409 generates an instruction job corresponding to the print job, and adds the instruction job to the print job information list. The instruction job is, as described with reference to FIG. 16, a job in which "component" is set to "WI", associated with the order ID of the print job.

Figure 17C:
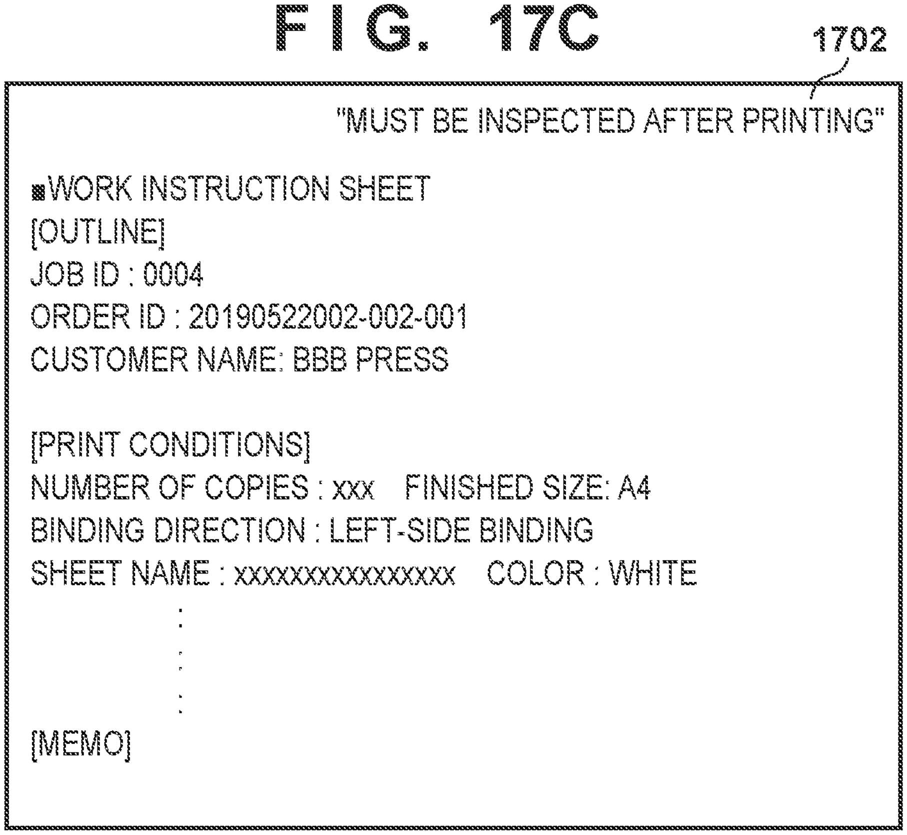

Step S1508 is a processing step of adding the additional character string to the print data of the instruction job. The job managing unit 409 accesses the print data of the instruction job, and adds the additional character string, which was set temporarily in the RAM 203 in step S1503 or step S1504, to the print data. FIG. 17A illustrates an example of the print data in the instruction job. Information which clarifies the specifications of the output, and assists the printing operator in performing post-processing tasks, is denoted in the print data. FIG. 17B illustrates an example in which a character string for in-line inspection ("inspected by image forming apparatus") 1701 has been added to the print data of the instruction job. FIG. 17C illustrates an example in which a character string for off-line inspection ("must be inspected after printing") 1702 has been added to the print data of the instruction job. Note that the instruction job generated in step S1507 may have the printing details indicated in FIGS. 17A to 17C. However, the job ID, the order ID, the customer name, the specifications, and so on are obtained from the original print job and copied.

Figure 18A:
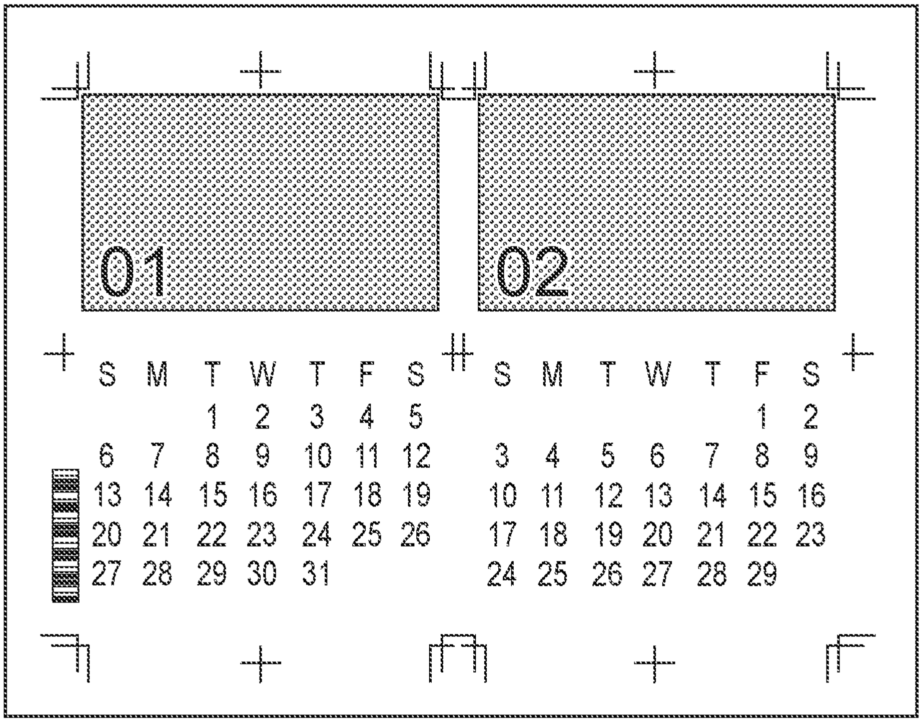
Figure 18B:
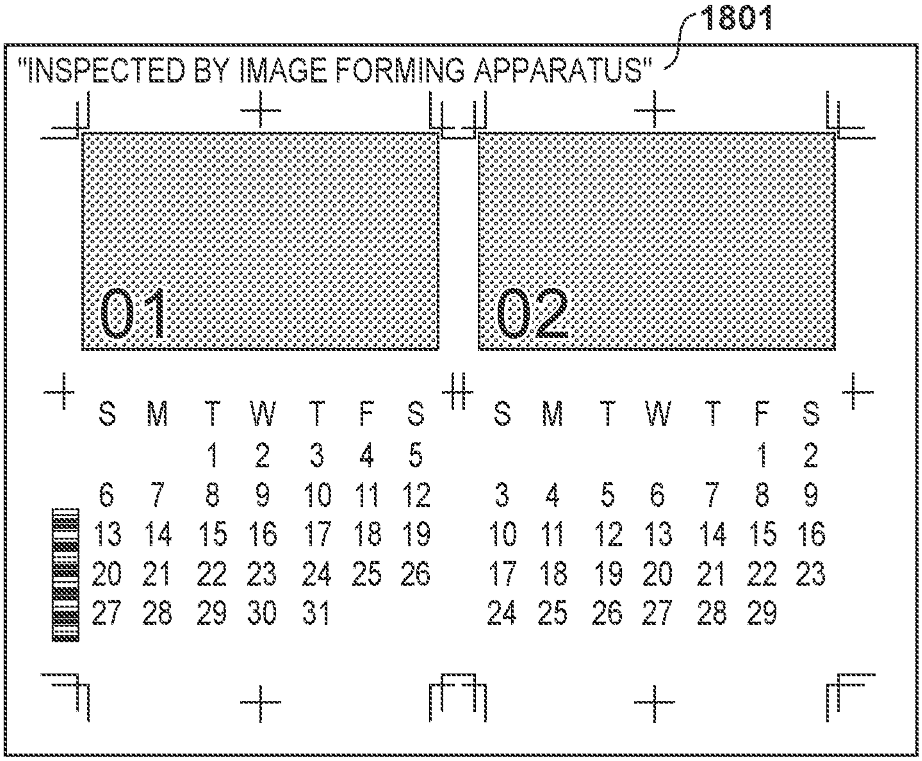

Step S1509 is a processing step of adding the additional character string to the margin region of the print data of the print job. The job managing unit 409 accesses the print data of the instruction job, and adds the additional character string, which was set temporarily in the RAM 203 in step S1503 or step S1504, to the margin region of the print data. FIG. 18A illustrates an example of the print data in the print job. In this example, the specifications are such that two pages worth of content is laid out on the paper and cut to obtain a deliverable. FIG. 18B illustrates an example in which a character string for in-line inspection ("inspected by image forming apparatus") 1801 has been added to the print data. FIG. 18C illustrates an example in which a character string for off-line inspection ("must be inspected after printing") 1802 has been added to the print data.

To the processing described above, information indicating that inspection processing is executed in-line, or off-line after printing, can be printed on output such as instructions, a product, or the like. This makes it possible to prevent off-line inspection omissions by the printing operator, redundant off-line inspections of output which have already been inspected in-line, and so on. The present embodiment has described a method in which information indicating in-line inspection and off-line inspection is added to instructions, print data, and the like. However, a format in which the information is displayed in the screen of the workflow application viewed by the printing operator, added to the print log, or the like may be used to achieve the same effects. Additionally, to what part of the instructions, the print data, the print log, or the like the information indicating in-line inspection or off-line inspection is to be added may be determined in accordance with a user instruction.

Note that step S1401 of FIG. 14 may be executed immediately before step S517 of FIG. 5. Doing so makes it possible to output printing instructions including the inspection method, or to write the inspection method in the margins of the printed material, even in the case of the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-003948, filed Jan. 14, 2020 which is hereby incorporated by reference herein in its entirety.

What is claimed is:

1. An inspection system including one or more image forming apparatuses and an information processing apparatus, the inspection system comprising:

a holder configured to hold a condition under which an inspection can be executed for respective image forming apparatuses;

one or more controllers having one or more processors and one or more memories, the one or more controllers configured to:

receive one or more print jobs, determine an image forming apparatus by which a print job of the one or more received print jobs is executed from among the one or more image forming apparatuses according to print settings of the one or more print jobs, each of which includes a request for a deliverable to be inspected, determine whether the setting of the print job meets the condition of the determined image forming apparatus;

set information indicating the inspection instruction in the print job when it is determined that the setting of the print job meets the condition, wherein the inspection instruction is set in the print job when it is determined that the setting of the print job does not meet the condition, and information indicating whether or not the condition is met in the print job is set; and execute inspection processing which inspects the printed material on the basis of the scanned image and a reference image registered in advance according to the inspection instruction in case that the setting of the print job meets the condition.

2. The inspection system according to claim 1, wherein the condition includes at least one of a paper type, a grammage, a paper size, and special processing.

3. The inspection system according to claim 1, wherein when a printer serving as a sending destination of the print job has been changed for the print job after the setting, the determination of an image forming apparatus, determination as to whether the setting of the print job meets the condition of the determined image forming apparatus, and the setting are redone.

4. The inspection system according to claim 1, further comprising:

a user interface that displays a setting of the print job, wherein an inspection instruction using a reader is set for the print job through the user interface.

5. The inspection system according to claim 4, wherein information displayed by the user interface includes identification information of the print job and information indicating an inspection method and the printer serving as an output destination.

6. The inspection system according to claim 1, further comprising a printer that prints an image based on a print job, wherein the one or more controllers is configured to:

when the inspection instruction is made for the print job and the printer includes the reader, cause the printer to print information indicating an inspection method.

7. The inspection system according to claim 6, wherein when a second print job of instructions corresponding to the print job is present, information indicating the instructions is added to the inspection method.

8. The inspection system according to claim 6, wherein when a margin is present in printed material resulting from the print job, information indicating the inspection method is added to the margin.

9. The inspection system according to claim 6, wherein when no print job of instructions corresponding to the print job is present and no margin is present in printed material resulting from the print job, a new print job of instructions corresponding to the print job is generated, with the print job including the information indicating the inspection method.

10. The inspection system according to claim 1, wherein the one or more controllers is configured to:

generate an inspection log including a result of the inspection.

11. The inspection system according to claim 10, wherein the inspection log includes a total number of copies printed in the print job, a result of the inspection, a number of copies determined to be defective, and an image received from the printer.

12. The inspection system according to claim 1, wherein the information indicating that the inspection processing has not been executed is notified by printing the information on a sheet surface.

13. The inspection system according to claim 1, wherein the inspection system includes at least an image forming apparatus and an information processing apparatus that can communicate with the image forming apparatus.

14. The inspection system according to claim 1, wherein the inspection is controlled not to be performed by causing a reader not to read the printed material when the job includes information indicating that the inspection is not to be performed.

15. The inspection system according to claim 1, wherein the inspection is controlled not to be performed by causing a reader not to generate a scanned image when the job includes information indicating that the inspection is not to be performed.

16. The inspection system according to claim 1, wherein the inspection is controlled to be performed by causing a reader to read the printed material and generate a scanned image when the job includes information indicating that the inspection is to be performed.

17. The inspection system according to claim 1, wherein even though the print job has been requested to be inspected for the deliverable, information indicating an off-line inspection which is different than the information indicating the inspection instruction is set in a case where it is determined that the inspection cannot be performed.

18. The inspection system according to claim 1, wherein the one or more controllers are further configured to:

output notification information, wherein the inspecting processing is not executed even when the printed material is read to generate a scanned image, when it is determined that the setting of the print job does not meet the condition, and the notification information indicating that the inspection processing has not been executed is output.

19. A non-transitory computer-readable medium in which is recorded a program, the program causing a computer to:

hold a condition under which an inspection can be executed for each of one or more image forming apparatuses;

receive one or more print jobs, determine an image forming apparatus by which a print job of the one or more received print jobs is executed from among the one or more image forming apparatuses according to print settings of the one or more print jobs, each of which includes a request for a deliverable to be inspected, determine whether the setting of a print job meets the condition of the determined image forming apparatus;

set information indicating the inspection instruction in the print job when it is determined that the setting of the print job meets the condition, wherein the inspection instruction is set in the print job when it is determined that the setting of the print job does not meet the condition, and information indicating whether or not the condition is met in the print job is set; and execute inspection processing on the basis of a scanned image and a reference image registered in advance according to the inspection instruction in case that the setting of the print job meets the condition.

20. A control method for a print system having a printer that prints an image based on a print job and a reader that reads a printed material printed by the printer and generates a scanned image, the method comprising:

holding a condition under which an inspection can be executed for each of one or more image forming apparatuses;

receiving one or more print jobs, determining an image forming apparatus by which a print job of the one or more received print jobs is executed from among the one or more image forming apparatuses according to print settings of the one or more print jobs, each of which includes a request for a deliverable to be inspected, determining whether the setting of the print job meets the condition of the determined image forming apparatus, setting information indicating the inspection instruction in the print job when it is determined that the setting of the print job meets the condition, wherein the inspection instruction is set in the print job when it is determined that the setting of the print job does not meet the condition, and information indicating whether or not the condition is met in the print job is set; and executing inspection processing on the basis of a scanned image and a reference image registered in advance according to the inspection instruction in case that the setting of the print job meets the condition.

* * * * *